(12) United States Patent
Shan et al.

(10) Patent No.: US 12,034,640 B2
(45) Date of Patent: Jul. 9, 2024

(54) DATA PROCESSING METHOD AND SYSTEM

(71) Applicant: Huawei Cloud Computing Technologies Co., Ltd., Gui'an New District (CN)

(72) Inventors: Weihua Shan, Xi'an (CN); Xuliang Li, Shenzhen (CN)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 17/025,832

(22) Filed: Sep. 18, 2020

(65) Prior Publication Data

US 2021/0004308 A1    Jan. 7, 2021

Related U.S. Application Data

(63) Continuation of application No. PCT/CN2019/078457, filed on Mar. 18, 2019.

(30) Foreign Application Priority Data

Mar. 19, 2018 (CN) .......................... 201810225569.6

(51) Int. Cl.
*G06F 15/16* (2006.01)
*G06F 9/50* (2006.01)
(Continued)

(52) U.S. Cl.
CPC ............ *H04L 47/10* (2013.01); *G06F 9/5061* (2013.01); *G06F 9/5083* (2013.01);
(Continued)

(58) Field of Classification Search
CPC ..... H04L 47/10; H04L 41/0803; H04L 47/12; G06F 9/5061; G06F 9/5083;
(Continued)

(56) References Cited

U.S. PATENT DOCUMENTS 4,901,277 A    2/1990 Soloway et al.
2008/0005392 A1    1/2008 Amini et al.
(Continued)

FOREIGN PATENT DOCUMENTS

CN    102739439 A    10/2012
CN    103117941 A    5/2013
(Continued)

OTHER PUBLICATIONS

Balkesen et al., "Scalable Data Partitioning Techniques for Parallel Sliding Window Processing over Data Streams," 8th International Workshop on Data Management for Sensor Network (DMSN 2011), Total 6 pages (Sep. 2011).

*Primary Examiner* — Alan S Chou
(74) *Attorney, Agent, or Firm* — Leydig, Voit & Mayer, Ltd.

(57) ABSTRACT

A data processing method is provided, including: sending, by an operation node, an alarm signal to a control node when a monitor detects that processing performance of data from a first data transmission pipe is lower than a first threshold (S102), where the alarm signal is used to indicate that the processing performance of the data from the first data transmission pipe is low; and when receiving the alarm signal, reducing, by the control node, a data amount that is from the first data transmission pipe and that is allocated to the operation node (S103). The solution can reduce fluctuation in processing performance of the data processing system during traffic control.

17 Claims, 11 Drawing Sheets

(51) Int. Cl.
  *G06F 11/07* (2006.01)
  *G06F 11/34* (2006.01)
  *H04L 41/0803* (2022.01)
  *H04L 47/10* (2022.01)
  *H04L 47/12* (2022.01)

(52) U.S. Cl.
  CPC ........ *G06F 11/0745* (2013.01); *G06F 11/076* (2013.01); *G06F 11/3409* (2013.01); *G06F 11/3433* (2013.01); *H04L 41/0803* (2013.01); *H04L 47/12* (2013.01); *G06F 2201/81* (2013.01)

(58) Field of Classification Search
  CPC ............... G06F 11/0745; G06F 11/076; G06F 11/3409; G06F 11/3433; G06F 2201/81; G06F 11/0772; G06F 9/44; G06F 11/3006; G06F 17/30575; G06F 11/0776; G05B 23/0221
  See application file for complete search history.

(56) References Cited

U.S. PATENT DOCUMENTS

| | | | |
|---|---|---|---|
| 2010/0031156 A1* | 2/2010 | Doyle | H04L 43/022 |
| | | | 715/736 |
| 2012/0155256 A1* | 6/2012 | Pope | G06F 13/128 |
| | | | 370/230 |
| 2015/0134797 A1* | 5/2015 | Theimer | H04L 41/5051 |
| | | | 709/223 |
| 2016/0098037 A1* | 4/2016 | Zornio | G05B 19/0421 |
| | | | 700/20 |
| 2016/0344617 A1* | 11/2016 | Gopalarathnam | H04L 45/22 |
| 2016/0350173 A1* | 12/2016 | Ahad | H04L 67/02 |
| 2018/0253458 A1* | 9/2018 | Goyal | H04L 67/1097 |
| 2019/0014183 A1* | 1/2019 | Brooks | H04L 41/0654 |
| 2019/0132387 A1* | 5/2019 | Singh | H04L 67/12 |

FOREIGN PATENT DOCUMENTS

| | | |
|---|---|---|
| CN | 104461674 A | 3/2015 |
| CN | 105094956 A | 11/2015 |
| CN | 107222403 A | 9/2017 |
| CN | 20180225569.6 | 4/2022 |
| KR | 20150071920 A | 6/2015 |

\* cited by examiner

DATA PROCESSING METHOD AND SYSTEM

CROSS-REFERENCE TO RELATED APPLICATIONS

This application is a continuation of International Application No. PCT/CN2019/078457, filed on Mar. 18, 2019, which claims priority to Chinese Patent Application No. 201810225569.6, filed on Mar. 19, 2018. The disclosures of the aforementioned applications are hereby incorporated by reference in their entireties.

TECHNICAL FIELD

Embodiments of the present application relate to the field of information technologies, and in particular, to a data processing method, device, and system.

BACKGROUND

In the current information era, an "information overload" or even "information explosion" problem often accompanies abundant information resources shared by people. When massive data is processed, if a data transmission speed fluctuates, for example, when the data transmission speed increases sharply, a data processor cannot bear sharply increased data in a short time. Consequently, data congestion is caused in the data processor, and performance of a data processing system deteriorates, which reduces the data processing speed (e.g. transactions per second, TPS) of the system.

To improve the data processing speed of the system, a performance monitor may be disposed in the system. When detecting that running of the system reaches an alarm condition, the performance monitor sends a system alarm signal, so that the system performs a data traffic control operation to reduce the data transmission speed, and reduce the data congestion. However, the data traffic control operation is performed on data of the entire system, and affects the data from different partitions. As a result, processing performance of the data processing system fluctuates.

SUMMARY

Embodiments of this application provide a data processing method and system, to separately perform data processing performance monitoring in different data transmission pipes, implementing processing performance monitoring at a finer granularity level. When the processing performance of data from a data transmission pipe is detected to be comparatively low, traffic control is performed only on the data from the data transmission pipe, without affecting traffic of data from another data transmission pipe. Therefore, this can reduce a case in which traffic of data from different partitions is reduced during the traffic control, and reduce fluctuation in processing performance of the data processing system during the traffic control.

According to a first aspect, an embodiment of this application provides a data processing method. The method is applied to a data processing system. The data processing system includes a control node and an operation node. A plurality of data transmission pipes is established between the control node and the operation node. The control node transmits received data to the operation node through the plurality of data transmission pipes. A monitor is disposed in the data processing system for the plurality of data transmission pipes. The method includes: sending, by the operation node, an alarm signal to the control node when the monitor detects that processing performance of data from the first data transmission pipe is lower than a first threshold, where the alarm signal is used to indicate that the processing performance of the data from the first data transmission pipe is excessively low, and the first data transmission pipe is any data transmission pipe in the plurality of data transmission pipes; and when receiving the alarm signal, reducing, by the control node, a data amount that is from the first data transmission pipe and that is allocated to the operation node.

Data processing performance is separately monitored for different data transmission pipes, implementing processing performance monitoring at a finer granularity level. When processing performance of data from a data transmission pipe is detected to be comparatively low, traffic control is performed only on the data from the data transmission pipe, without affecting traffic of data from another data transmission pipe. Therefore, this can reduce a case in which traffic of data from different partitions is reduced during the traffic control, and reduce fluctuation in processing performance of the data processing system during the traffic control.

In an embodiment, that the monitor is configured to monitor processing performance of data from the plurality of data transmission pipes specifically includes that the monitor is configured to perform at least one of the following for data from each data transmission pipe: monitoring a data processing speed of the operation node; and monitoring a processing response speed of the operation node.

Optionally, the operation node includes the monitor.
Optionally, the control node includes the monitor.

In an embodiment, the sending, by the operation node, an alarm signal to the control node when the monitor detects that processing performance of data from the first data transmission pipe is lower than a first threshold includes: sending, by the operation node, the alarm signal to the control node when the monitor detects that a processing speed of the data from the first data transmission pipe is lower than a second threshold.

In an embodiment, the sending, by the operation node, an alarm signal to the control node when the monitor detects that processing performance of data from the first data transmission pipe is lower than a first threshold includes: sending, by the operation node, the alarm signal to the control node when the monitor detects that a processing response speed of the data from the first data transmission pipe is lower than a third threshold.

In an embodiment, the reducing, by the control node, a data amount that is from the first data transmission pipe and that is allocated to the operation node includes at least one of the following: reducing, by the control node, a rate at which the first data transmission pipe receives data; and reducing, by the control node, a rate at which the first data transmission pipe transmits data to the operation node.

In an embodiment, the plurality of data transmission pipes established between the control node and the operation node are created by the control node according to partitioning policy information, and the partitioning policy information is used by the control node to determine a partition used to receive data.

According to a second aspect, an embodiment of this application provides a data processing method. The method is applied to a data processing system. The data processing system includes a control node and an operation node. A plurality of data transmission pipes is established between the control node and the operation node. The control node transmits received data to the operation node through the plurality of data transmission pipes. A monitor is disposed in the data processing system for the plurality of data transmission pipes. The method includes: detecting, by the monitor, data processing performance for data from each of the data transmission pipes in the data processing system; and sending, by the operation node, an alarm signal to the control node when the monitor detects that processing performance of data from the first data transmission pipe is lower than a first threshold, where the alarm signal indicates that the processing performance of the data from the first data transmission pipe is excessively low, the first data transmission pipe is any data transmission pipe in the plurality of data transmission pipes, and the alarm signal is used by the control node to reduce, based on the alarm signal, a data amount that is from the first data transmission pipe and that is allocated to the operation node.

Data processing performance is separately monitored for different data transmission pipes, implementing processing performance monitoring at a finer granularity level. When processing performance of data from a data transmission pipe is detected to be comparatively low, traffic control is performed only on the data from the data transmission pipe, without affecting traffic of data from another data transmission pipe. Therefore, this can reduce a case in which traffic of data from different partitions is reduced during the traffic control, and reduce fluctuation in processing performance of the data processing system during the traffic control.

Optionally, the operation node includes the monitor.

In an embodiment, that the monitor is configured to monitor processing performance of data from the plurality of data transmission pipes specifically includes that the monitor is configured to perform at least one of the following for data from each data transmission pipe: monitoring a data processing speed of the operation node; and monitoring a processing response speed of the operation node.

In an embodiment, the sending, by the operation node, an alarm signal to the control node when the monitor detects that processing performance of data from the first data transmission pipe is lower than a first threshold includes: sending, by the operation node, the alarm signal to the control node when the monitor detects that a processing speed of the data from the first data transmission pipe is lower than a second threshold.

In an embodiment, the sending, by the operation node, an alarm signal to the control node when the monitor detects that processing performance of data from the first data transmission pipe is lower than a first threshold includes: sending, by the operation node, the alarm signal to the control node when the monitor detects that a processing response speed of the data from the first data transmission pipe is lower than a third threshold.

According to a third aspect, an embodiment of this application provides a data processing method. The method is applied to a data processing system. The data processing system includes a control node and an operation node. A plurality of data transmission pipes are established between the control node and the operation node. The control node transmits received data to the operation node through the plurality of data transmission pipes. A monitor is disposed in the data processing system for the plurality of data transmission pipes. The method includes: detecting, by the monitor, data processing performance for data from each of the data transmission pipes in the data processing system; and when receiving an alarm signal, reducing, by the control node, a data amount that is from a first data transmission pipe and that is allocated to the operation node; where the alarm signal is sent when the monitor detects that the processing performance of the data from the first data transmission pipe is lower than a first threshold, the alarm signal is used to indicate that the processing performance of the data from the first data transmission pipe is excessively low, and the first data transmission pipe is any data transmission pipe in the plurality of data transmission pipes.

Optionally, the control node includes the monitor.

In an embodiment, that the operation node sends the alarm signal to the control node when the monitor detects that the processing performance of the data from the first data transmission pipe is lower than the first threshold includes: the operation node sends the alarm signal to the control node when the monitor detects that a processing speed of the data from the first data transmission pipe is lower than a second threshold.

In an embodiment, that the operation node sends the alarm signal to the control node when the monitor detects that the processing performance of the data from the first data transmission pipe is lower than the first threshold includes: the operation node sends the alarm signal to the control node when the monitor detects that a processing response speed of the data from the first data transmission pipe is lower than a third threshold.

In an embodiment, the reducing, by the control node, a data amount that is from the first data transmission pipe and that is allocated to the operation node includes at least one of the following: reducing, by the control node, a rate at which the first data transmission pipe receives data; and reducing, by the control node, a rate at which the first data transmission pipe transmits data to the operation node.

Data processing performance is separately monitored for different data transmission pipes, implementing processing performance monitoring at a finer granularity level. When processing performance of data from a data transmission pipe is detected to be comparatively low, traffic control is performed only on the data from the data transmission pipe, without affecting traffic of data from another data transmission pipe. Therefore, this can reduce a case in which traffic of data from different partitions is reduced during the traffic control, and reduce fluctuation in processing performance of the data processing system during the traffic control.

According to a fourth aspect, an embodiment of this application provides a data processing system. The data processing system includes a control node and an operation node. A plurality of data transmission pipes is established between the control node and the operation node. The control node transmits received data to the operation node through the plurality of data transmission pipes. A monitor is disposed in the data processing system for the data from the plurality of data transmission pipes. The operation node is configured to process the data from the plurality of data transmission pipes. The monitor is configured to monitor processing performance of the data from the plurality of data transmission pipes. The operation node is further configured to send an alarm signal to the control node when the monitor detects that processing performance of data from the first data transmission pipe is lower than a first threshold. The alarm signal is used to indicate that the processing performance of the data from the first data transmission pipe is excessively low. The first data transmission pipe is any data transmission pipe in the plurality of data transmission pipes. The control node is configured to: when receiving the alarm signal, reduce a data amount that is from the first data transmission pipe and that is allocated to the operation node.

In an embodiment, the monitor is specifically configured to perform at least one of the following for data from each data transmission pipe: monitoring a data processing speed of the operation node; and monitoring a processing response speed of the operation node.

In an embodiment, the operation node is specifically configured to send the alarm signal to the control node when the monitor detects that a processing speed of the operation node on the data from the first data transmission pipe is lower than a second threshold.

In an embodiment, the operation node is specifically configured to send the alarm signal to the control node when the monitor detects that a processing response speed of the operation node on the data from the first data transmission pipe is lower than a third threshold.

In an embodiment, the control node is specifically configured to perform at least one of the following when receiving the alarm signal: reducing a rate at which the first data transmission pipe receives data; and reducing a rate at which the first data transmission pipe transmits data to the operation node.

In an embodiment, the plurality of data transmission pipes established between the control node and the operation node are created by the control node according to partitioning policy information. The partitioning policy information is used by the control node to determine a partition used to receive data.

In an embodiment, when the data processing system is a real-time data processing system, and when there are a plurality of operation nodes and the operation node includes at least one database, the monitor is configured to monitor the processing performance of the data from the plurality of data transmission pipes in a database. In a scenario of the real-time data processing system, an operation node selected for the monitoring is the database, so that the data processing performance of the data processing system is monitored more accurately, and the data traffic control is performed more accurately.

According to a fifth aspect, an embodiment of this application provides a data processing system. The data processing system includes a module or unit configured to perform the data processing method provided in any one of the first aspect or the possible implementations of the first aspect.

Optionally, the data processing system includes an operation node provided in a sixth aspect or an eighth aspect. The data processing system further includes a control node provided in a seventh aspect or a ninth aspect.

According to a sixth aspect, an embodiment of this application provides an operation node. The operation node includes a module or unit configured to perform the data processing method provided in any one of the second aspect or the possible implementations of the second aspect.

According to a seventh aspect, an embodiment of this application provides a control node. The control node includes a module or unit configured to perform the data processing method provided in any one of the third aspect or the possible implementations of the third aspect.

According to an eighth aspect, an embodiment of this application provides an operation node including a processor, a memory, a communications interface, and a bus. The processor, the communications interface, and the memory communicate with each other through the bus. The communications interface is configured to receive and send data. The memory is configured to store an instruction. The processor is configured to invoke the instruction in the memory, to perform the data processing method provided in any one of the second aspect or the possible implementations of the second aspect.

According to a ninth aspect, an embodiment of this application provides a control node including a processor, a memory, a communications interface, and a bus. The processor, the communications interface, and the memory communicate with each other through the bus. The communications interface is configured to receive and send data. The memory is configured to store an instruction. The processor is configured to invoke the instruction in the memory, to perform the data processing method provided in any one of the third aspect or the possible implementations of the third aspect.

According to a tenth aspect, an embodiment of this application provides a computer-readable storage medium. The storage medium includes an instruction. When the instruction is run, a data processing system is enabled to perform the data processing method in any one of the first aspect or the possible implementations of the first aspect.

According to an eleventh aspect, an embodiment of this application provides a computer-readable storage medium. The storage medium includes an instruction. When the instruction is run an operation node, the operation node is enabled to perform the data processing method in any one of the second aspect or the possible implementations of the second aspect.

According to a twelfth aspect, an embodiment of this application provides a computer-readable storage medium. The storage medium includes an instruction. When the instruction is run on a control node, the control node is enabled to perform the data processing method in any one of the third aspect or the possible implementations of the third aspect.

According to a thirteenth aspect, an embodiment of this application provides a computer program. The computer program includes an instruction. When the instruction is run, a data processing system is enabled to perform the data processing method provided in any one of the first aspect or the possible implementations of the first aspect.

According to a fourteenth aspect, an embodiment of this application provides a computer program. The computer program includes an instruction. When the instruction runs on an operation node, the operation node is enabled to perform the data processing method provided in any one of the second aspect or the possible implementations of the second aspect.

According to a fifteenth aspect, an embodiment of this application provides a computer program. The computer program includes an instruction. When the instruction runs on a control node, the control node is enabled to perform the data processing method according to any one of the third aspect or the possible implementations of the third aspect.

According to a sixteenth aspect, an embodiment of this application provides a chip product to perform the method in any one of the first aspect or the possible implementations of the first aspect.

According to a seventeenth aspect, an embodiment of this application provides a chip product to perform the method in any one of the second aspect or the possible implementations of the second aspect.

According to an eighteenth aspect, an embodiment of this application provides a chip product to perform the method in any one of the third aspect or the possible implementations of the third aspect.

BRIEF DESCRIPTION OF DRAWINGS

The following describes accompanying drawings used in embodiments of this application.

DESCRIPTION OF EMBODIMENTS

Figure 1:
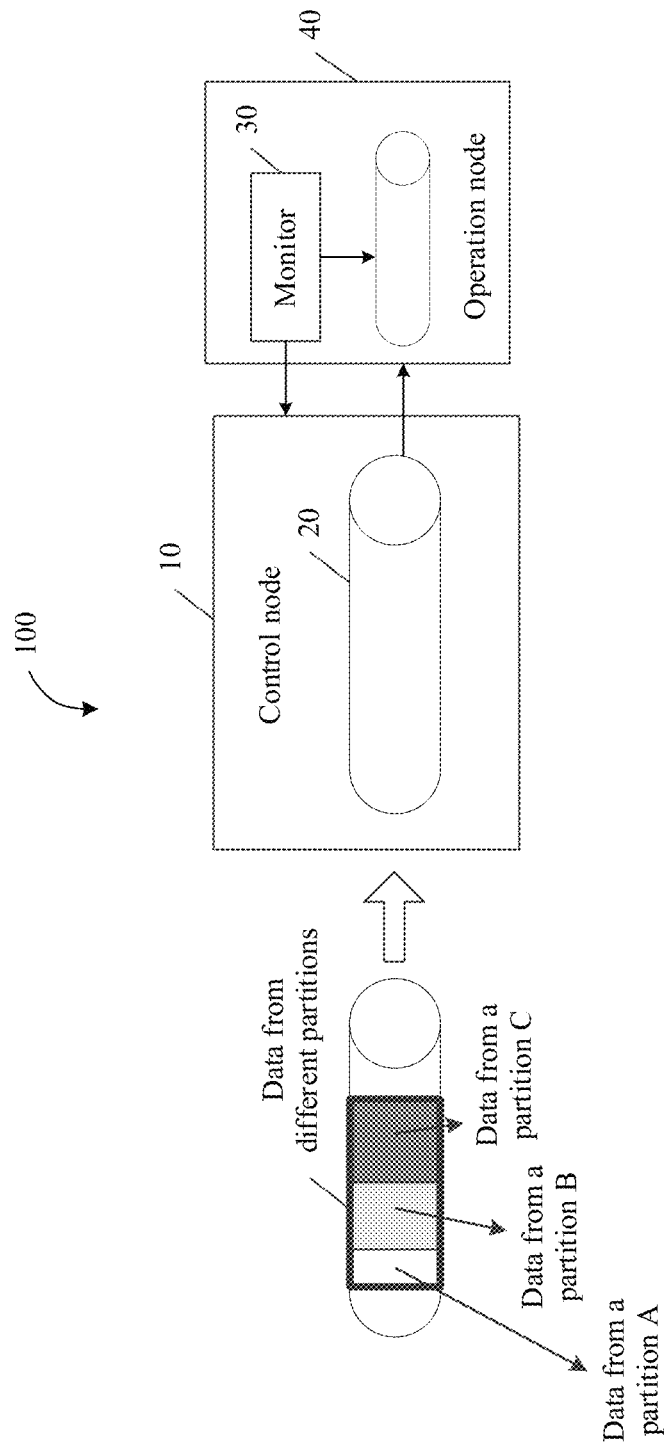
FIG. 1 is a schematic diagram of an architecture of a data processing system according to an embodiment of this application.

To help understanding of embodiments of this application, some related concepts or terms in the embodiments of this application are explained.

(1) Data Partition

Data partition is allocating data in a table with a large amount of data to different system partitions, hard disks, or different server devices according to a preset partitioning policy, to achieve balanced data allocation. The data partition can balance the large amount of data to different storage media, so that each partition evenly stores a part of data. When the data in the data table is operated, a partition in which the data is located may be located. In addition, the data partition may also facilitate data management. A partition may be located for processing the data, without affecting another partition. This improves data processing efficiency. For example, when partitioning is performed based on a data storage date, and when data stored in a time period needs to be deleted, a partition corresponding to the time period may be directly located for deleting the data, without affecting a partition in which data in another time period is located. A control node in a data processing system may construct different data transmission pipes according to a partitioning policy to store the data from different partitions. In the embodiments of this application, the data partition may be a partition from which the data comes, or a partition into which the data is to be stored.

(2) Partitioning Policy

A Partitioning policy may be obtained by a control node in a data processing system based on a configuration file or through an operation node interface. The partitioning policy indicates a storage node on which data received by the data processing system needs to be stored. The control node may construct different data transmission pipes according to the partitioning policy. The different data transmission pipes store, in partitions according to the partitioning policy, data received from the outside or data actively obtained. Specifically, for example, one data transmission pipe is constructed for data from each partition. In other words, a quantity of partitions indicated by the partitioning policy is the same as a quantity of constructed data transmission pipes. For another example, one data transmission pipe may be constructed for data from several partitions indicated by the partitioning policy. A specific policy of constructing the data transmission pipe according to the partitioning policy is not limited in the embodiments of this application.

For example, the data partitioning policy may be partitioning based on a type of data, partitioning based on a value of a field of data, partitioning based on an initiation place, an initiator, or the like of data, or may be another policy. The specific partitioning policy is not limited in the embodiments of this application. Each data transmission pipe may be used to store data of one partition, or data of a plurality of partitions. Data storage and traffic control in the different data transmission pipes are independent, without affecting each other.

(3) Traffic Control

Traffic control is controlling data traffic in a data processing system when data processing performance of the data processing system deteriorates. The traffic control may include two types: One is a conventional traffic control manner. To be specific, a quality of service (QoS) module may be used to perform the traffic control based on a source address, a destination address, a source port, a destination port, and a protocol type. The other is an intelligent hardware or system software traffic control manner. To be specific, a traffic control device or traffic control software may be used to control a transmission rate and traffic control time of a data packet. A traffic control manner used in the embodiments of this application may be either of the two manners, or may be another traffic control manner, for example, a new traffic control manner in the future.

When the traffic control is performed on data in a data transmission pipe, traffic control between different data transmission pipes is independent, without affecting each other. In other words, the traffic control is performed on data in a data transmission pipe, without affecting traffic of data in another data transmission pipe.

(4) Operation Node

An operation node is configured to process data in a data processing system. Specifically, the data processing may be data operation, data importing, data query, or the like, or may be detecting whether a transaction is fraudulent. The operation node may extract data from a data transmission pipe, and perform processing processes such as operation, importing, or query. One operation node may extract data from a plurality of data transmission pipes and process the data, or may obtain data from only one data transmission pipe and process the data. This is not limited in the embodiments of this application. The operation node may be, for example, a database, or a processing node having a specific operation function. In the embodiments of this application, a function of the operation node may be implemented by a device, or may be implemented by several devices. This is not limited in the embodiments of this application. When the data processing system is a big data processing system, the operation node may be used to perform processing such as operation, data importing, and data query on big data.

Refer to FIG. 1. FIG. 1 is a schematic diagram of an architecture of a data processing system 100 according to an embodiment of this application. The data processing system 100 includes a control node 10, a data transmission pipe 20, a monitor 30, and at least one operation node 40. The monitor 30 may be disposed in the operation node 40.

The control node 10 is configured to construct the data transmission pipe 20. The control node 10 is further configured to receive and combine data, and temporarily store the received data in the constructed data transmission pipe 20. The data received by the control node 10 may be data from different partitions. As shown in FIG. 1, the data received by the control node 10 may include data from a partition A, data from a partition B, and data from a partition C. The control node 10 may be specifically a start node that receives the data and initiates an operation in any framework of Storm, Flink, and Spark. The control node 10 may also be a node in another framework. This is not limited in this application. In this embodiment of this application, a function of the control node 10 may be implemented by a device, or may be implemented by several devices. This is not limited in the embodiment of this application. In the data processing system 100, there may be one or more control nodes 10. As shown in FIG. 1, there may be one control node in the data processing system 100. It may be understood that there may be a plurality of control nodes 10 in the data processing system 100, and each control node 10 of the plurality of control nodes 10 is connected to the operation node 40 through the data transmission pipe 20.

The data transmission pipe 20 is configured to transmit data from a user or another node to the operation node 40. The data transmission pipe 20 is a logical concept and corresponds to a physical storage area. Different data transmission pipes 20 may be distributed on physical entities such as different system partitions, different hard disks, or different server devices. The data transmission pipe 20 may be a global data transmission pipe, and is configured to store data from all partitions. Alternatively, the data transmission pipe 20 may be a separated data transmission pipe, and is configured to separately store the data from different partitions. For example, as shown in FIG. 1, for the data from the different partitions: the data from the partition A, the data from the partition B, and the data from the partition C, the control node 10 may establish a data transmission pipe. The data transmission pipe stores the data from the partition A, the data from the partition B, and the data from the partition C. In addition, the control node 20 may also establish three data transmission pipes. The three data transmission pipes respectively store the data from the partition A, the data from the partition B, and the data from the partition C.

The control node 10 is further configured to create the monitor 30 when the data processing system 100 is deployed or initialized. The monitor 30 is configured to monitor data processing performance. The monitor 30 may detect a response speed in a data processing process. For example, the monitor 30 detects a data request delay in a data processing process. The monitor 30 may further detect a data processing speed of an operation node. For example, the monitor 30 detects a data processing speed of a database.

The monitor 30 may be located in the operation node 40, and may be created by the control node 10 when the data processing system 100 is deployed or initialized. The monitor 30 may be configured to perform performance monitoring in the data processing process in the operation node 40. When detecting that the processing performance in the data processing process is excessively low, the monitor 30 sends an alarm signal indicating that the data processing performance is excessively low to the control node 10. Specifically, when detecting that the data request delay in the data processing process exceeds a preset delay requirement threshold, or detecting that a data processing speed of an operation node is lower than a preset processing speed threshold, the monitor 30 sends the alarm signal to the control node 10. The alarm signal is used to indicate that the data processing performance is excessively low.

The operation node 40 is configured to perform processing processes such as an operation, importing, or query on data. The operation node 40 may be specifically, for example, a database, or a processing node having a specific operation function. The database is configured to store data, and may further be configured to query data, delete data, or the like. The processing node is configured to extract data from the data transmission pipe 20 for processing the data, for example, perform an addition operation on the data, perform a subtraction operation on the data, query the data, or detect whether transaction data is fraudulent. After processing the data, the processing node may perform a cleanup work as required, for example, delete a message. When processing the data, the operation node 40 may distinguish between data transmission pipes from which the data comes, or may not distinguish between data transmission pipes from which the data comes. In the data processing system 100, there may be one or more operation nodes 40. As shown in FIG. 1, there may be one operation node in the data processing system 100. It may be understood that there may be a plurality of operation nodes 40 in the data processing system 100, and each operation node 40 of the plurality of operation nodes is connected to the control node 10 through the data transmission pipe 20.

In this embodiment of this application, a function of the operation node 40 may be implemented by a device, or may be implemented by several devices. This is not limited in this embodiment of this application. The operation node 40 is not limited to the foregoing example, or may be another node that needs to be detected. This is not limited in this embodiment of this application.

The control node 10 is further configured to, when receiving the alarm signal, perform traffic control on the data from the data transmission pipe 20. Specifically, that the control node 10 performs the traffic control may be reducing a speed at which data is put into the data transmission pipe 20, or may be reducing a speed at which the operation node 40 extracts data from the data transmission pipe 20. When performing the traffic control on the data from the data transmission pipe 20, the control node 10 may separately perform the traffic control in the different data transmission pipes 20. To be specific, performing the traffic control in a data transmission pipe does not affect traffic in another data transmission pipe.

It should be noted that the data processing system shown in FIG. 1 is only intended to more clearly describe technical solutions in this application, but is not intended to limit this application. A person of ordinary skill in the art may know that as a system architecture evolves and a new service scenario emerges, the technical solutions provided in this application are applied to a similar technical problem.

When a data traffic control operation is performed, global traffic control is performed on data of the entire system without distinguishing partitions. The data from the different partitions is affected by the traffic control operation, and processing performance of the data processing system fluctuates.

Based on the schematic diagram of the architecture of the data processing system in FIG. 1, the embodiments of this application provide a data processing method and system, to improve the data processing performance in the data processing system.

In this application, for data from a data transmission pipe in a data processing system, a monitor is used to monitor data processing performance. When the monitor detects that the processing performance of the data from a first data transmission pipe is lower than a first threshold, and after a control node receives an alarm signal, the control node reduces a data amount that is from the first data transmission pipe and that is allocated to the operation node. The first data transmission pipe may be any data transmission pipe in a plurality of data transmission pipes. The foregoing procedure is performed to monitor data from different data transmission pipes at a finer granularity level. When processing performance of data from a data transmission pipe is detected to be comparatively low, traffic control is performed only on the data from the data transmission pipe, without affecting traffic of data from another data transmission pipe. Therefore, this can reduce a case in which traffic of data from different partitions is reduced during the traffic control, and reduce fluctuation in processing performance of the data processing system during the traffic control.

Figure 2:
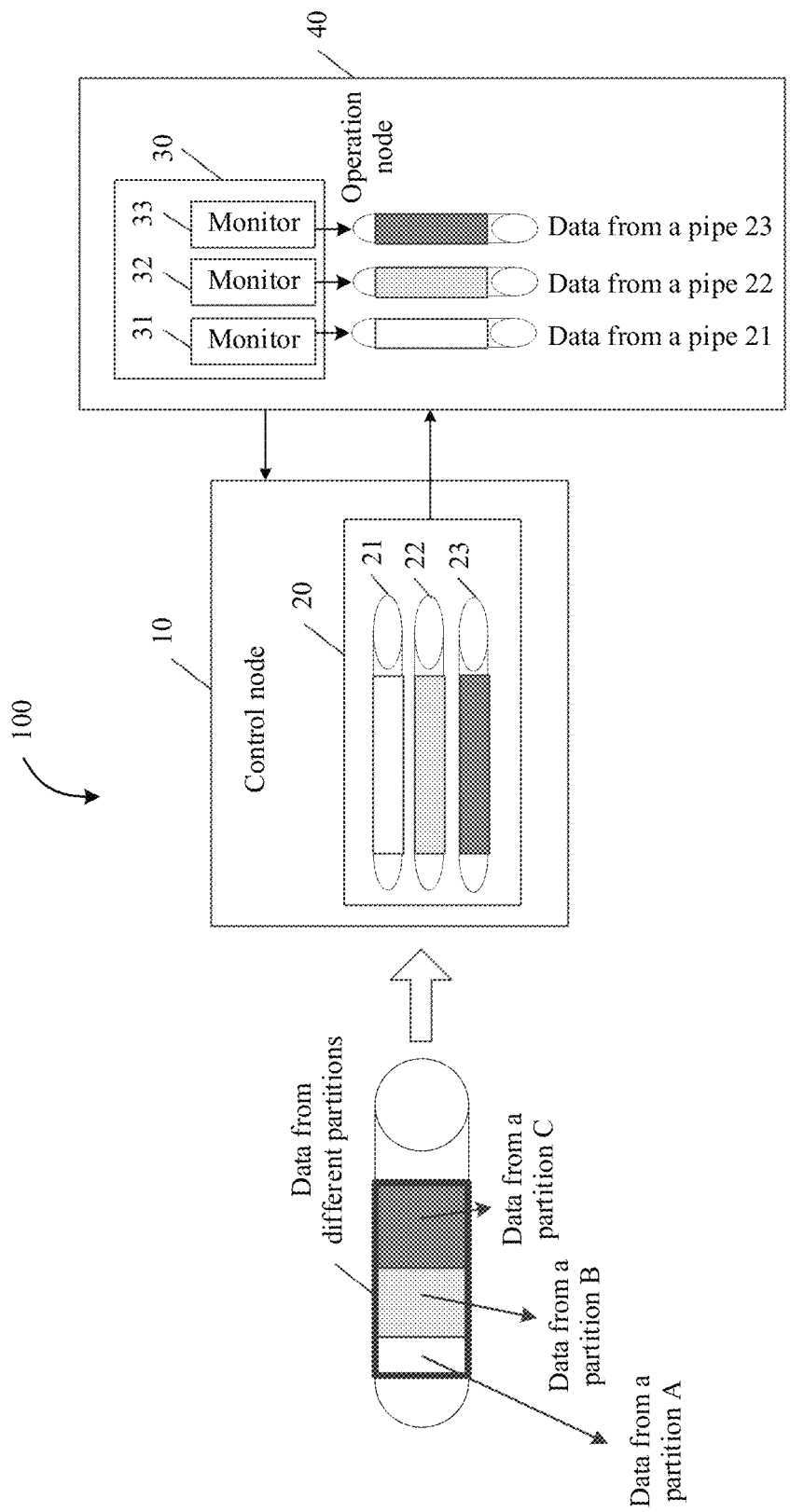
FIG. 2 is a schematic diagram of a structure of a data processing system 100 according to an embodiment of this application.

The embodiments of this application provide a data processing system. Refer to FIG. 2. FIG. 2 is a schematic diagram of a structure of a data processing system 100 according to an embodiment of this application. As shown in FIG. 2, in the data processing system 100, a control node 10 establishes a plurality of data transmission pipes 20 for data from different partitions. The control node 10 transmits received data to an operation node 40 through the plurality of data transmission pipes 20. A plurality of monitors 30 are disposed in the data processing system 100 for the data from the data transmission pipe. The monitor is configured to monitor data processing performance for data from each data transmission pipe.

The control node 10 is configured to, when receiving an alarm signal, reduce a data amount that is from a first data transmission pipe and that is allocated to the operation node 40. The first data transmission pipe is any data transmission pipe in the plurality of data transmission pipes.

Specifically, as shown in FIG. 2, the control node 10 may separately establish three independent data transmission pipes for data from a partition A, data from a partition B, and data from a partition C according to a partitioning policy: a data transmission pipe 21, a data transmission pipe 22, and a data transmission pipe 23. Data transmission and traffic control between the three data transmission pipes do not affect each other.

The data transmission pipe 21 is configured to transmit received data from the partition A to the operation node 40. The data transmission pipe 22 is configured to transmit received data from the partition B to the operation node 40. The data transmission pipe 23 is configured to transmit received data from the partition C to the operation node 40. In the data processing system 10, the monitor is disposed for the data from each data transmission pipe to detect the data processing performance. As shown in FIG. 2, a monitor 31 is disposed for data from the data transmission pipe 21. A monitor 32 is disposed for data from the data transmission pipe 22. A monitor 33 is disposed for data from the data transmission pipe 23. For the data from the data transmission pipe 21, when the monitor 31 detects that processing performance of the data from the data transmission pipe 21 is lower than a first threshold, the monitor 31 may send the alarm signal to the control node 10. The alarm signal is used to indicate that the processing performance of the data from the data transmission pipe 21 is excessively low. After receiving the alarm signal, the control node 10 reduces a data amount that is from the data transmission pipe 21 and that is allocated to the operation node 40. For the data from the data transmission pipe 22, when the monitor 32 detects that processing performance of the data from the data transmission pipe 22 is lower than the first threshold, the monitor 32 may send the alarm signal to the control node 10, to indicate that the processing performance of the data from the data transmission pipe 22 is excessively low. After receiving the alarm signal, the control node 10 reduces a data amount that is from the data transmission pipe 22 and that is allocated to the operation node 40. For the data from the data transmission pipe 23, when the monitor 33 detects that processing performance of the data from the data transmission pipe 23 is lower than the first threshold, the monitor 33 may send the alarm signal to the control node 10, to indicate that the processing performance of the data from the data transmission pipe 23 is excessively low. After receiving the alarm signal, the control node 10 reduces a data amount that is from the data transmission pipe 23 and that is allocated to the operation node 40.

It should be noted that processes of monitoring and the traffic control performed on data from different data transmission pipes are independent. In other words, monitoring on the data from the data transmission pipe 21 does not affect monitoring on the data from the data transmission pipe 22, and does not affect monitoring on the data from the data transmission pipe 23. The traffic control performed in the data transmission pipe 21 does not affect the data from the data transmission pipe 22, and does not affect the data from the data transmission pipe 23. In addition, first thresholds set for the data from the different data transmission pipes may be the same or may be different. This is not limited in this embodiment of this application.

As shown in FIG. 2, the three monitors are respectively used to monitor data from the three data transmission pipes in the operation node 40. If the processing performance of the data from one data transmission pipe in the three data transmission pipes is excessively low, the control node 10 performs the traffic control only on the data from the data transmission pipe with the excessively low data processing performance, and does not perform the traffic control on data in another data transmission pipe. The performance monitoring and the traffic control are performed at the finer granularity level. Therefore, this can reduce a case in which traffic of data from different partitions is reduced during the traffic control, improve an overall data processing speed, and reduce fluctuation in processing performance of the data processing system during the traffic control.

It may be understood that this example is merely used to explain this embodiment of this application, and shall not be construed as a limitation. A quantity of monitors 30 and a quantity of data transmission pipes 20 are not limited to three, and may also be another quantity.

The data processing system 100 may be a distributed system, or may be a centralized system. This is not limited in this embodiment of this application. All the control node 10, the data transmission pipe 20, the monitor 30, and the operation node 40 may be implemented by a virtual machine. For specific descriptions of the control node 10, the data transmission pipe 20, the monitor 30, and the operation node 40, refer to the architecture of the data processing system described in FIG. 1. Details are not described herein again.

Figure 3:
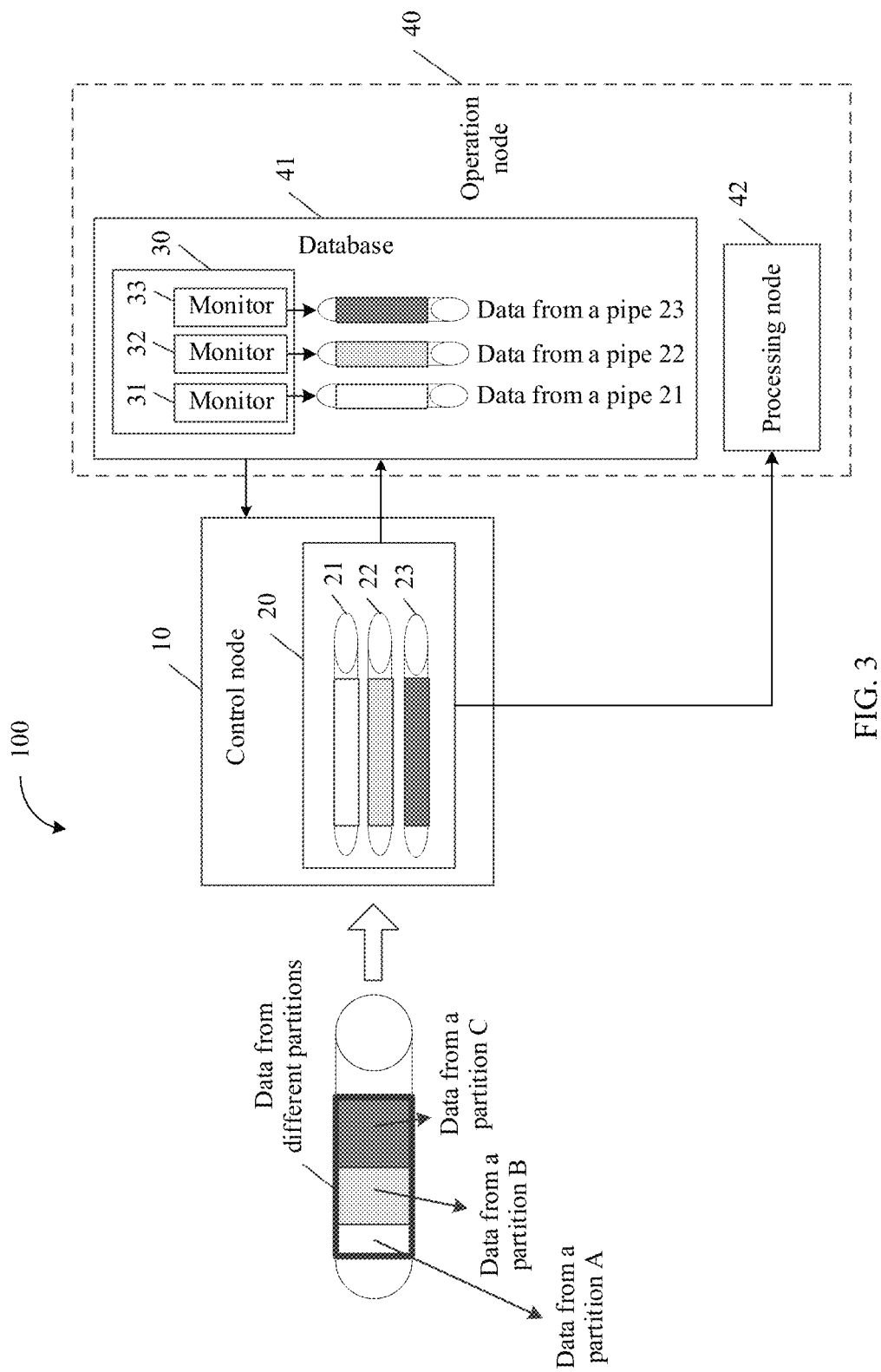
FIG. 3 is a schematic diagram of a structure of another data processing system 100 according to an embodiment of this application.

There may be a plurality of operation nodes 40 in the data processing system 100. Refer to FIG. 3. FIG. 3 is a schematic diagram of a structure of another data processing system 100 according to an embodiment of this application. In the data processing system 100, there may be a plurality of operation nodes 40. In the plurality of operation nodes 40, data processing performance monitoring for distinguishing data transmission pipes may be performed in each operation node. Alternatively, the data processing performance monitoring for distinguishing the data transmission pipes may be performed on some operation nodes that need the data processing performance monitoring. That the processing performance monitoring is performed in which operation node is determined based on a service requirement. This is not limited in this embodiment of this application.

As shown in FIG. 3, two operation nodes 40 are used as an example in FIG. 3: a database 41 and a processing node 42. In the data processing system 100, the database 41 may be set as a monitoring object. A monitor 30 is disposed to detect processing performance of data from different data transmission pipes 20 in the database, but does not perform the data processing performance monitoring on the processing node 42. A monitor 31 is disposed to perform data processing performance monitoring on data from a data transmission pipe 21. A monitor 32 is disposed to perform data processing performance monitoring on data from a data transmission pipe 22. A monitor 33 is disposed to perform data processing performance monitoring on data from a data transmission pipe 23. The data processing performance monitoring may not be performed on the processing node 42 based on a service requirement.

For specific descriptions of a control node 10, the data transmission pipe 20, the monitor 30, and the operation node 40, refer to embodiments described in FIG. 1 and FIG. 2. Details are not described herein again.

Figure 4:
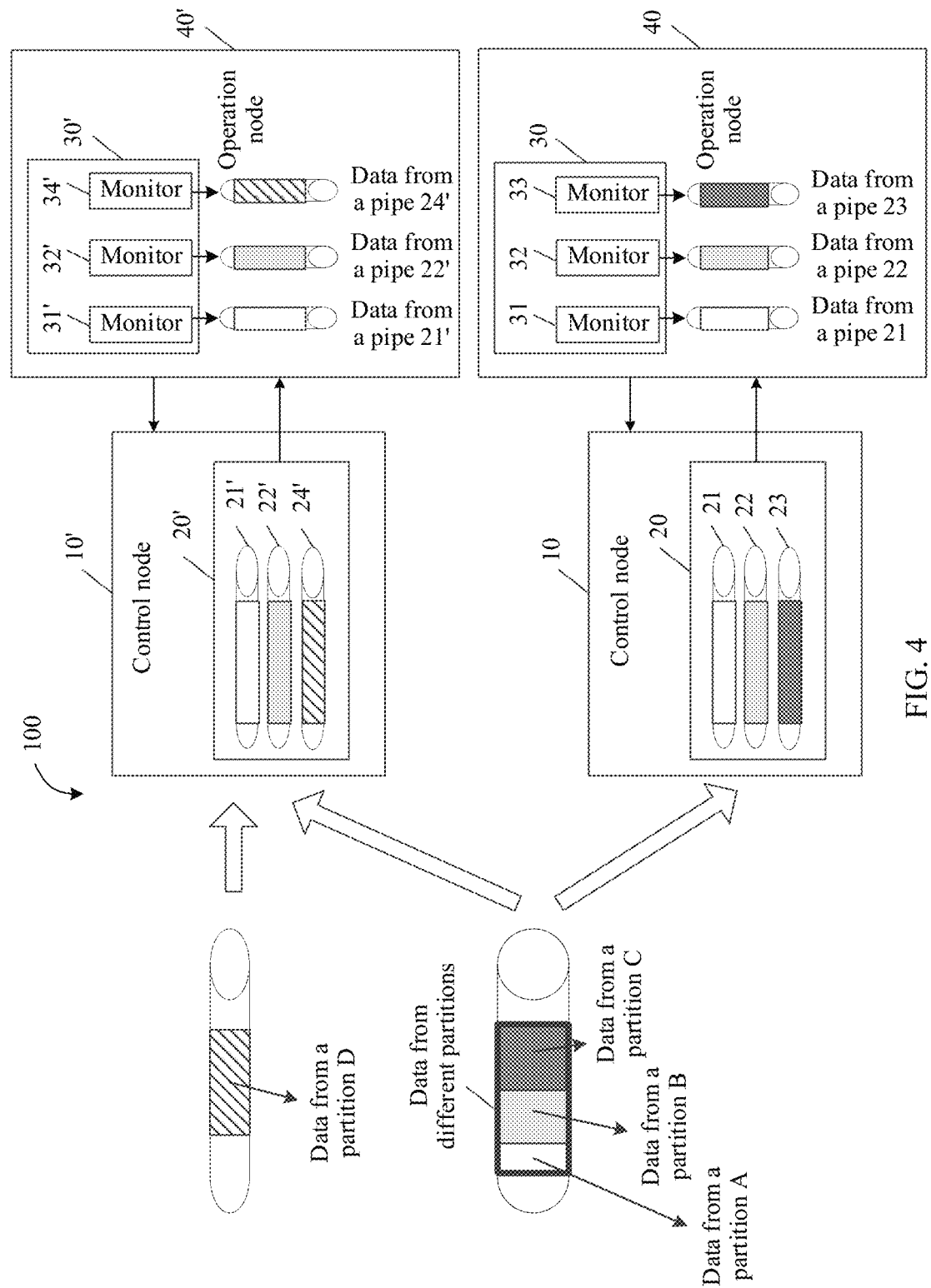
FIG. 4 is a schematic diagram of a structure of a still another data processing system 100 according to an embodiment of this application.

Optionally, the data processing system 100 may include a plurality of control nodes 10. Partitions of data received by the plurality of control nodes may be totally different, may be the same, or may be partially the same. Refer to FIG. 4. FIG. 4 is a schematic diagram of a structure of still another data processing system 100 according to an embodiment of this application.

As shown in FIG. 4, the data processing system 100 may include a plurality of control nodes. Two control nodes are used as an example in FIG. 4: a control node 10 and a control node 10'. Partitions to which data received by different control nodes belongs may be partially the same. As shown in FIG. 4, the control node 10 may receive data from a partition A, data from a partition B, and data from a partition C, and allocate the data from the partition A, the data from the partition B, and the data from the partition C to an operation node 40. The control node 10' may receive the data from the partition A, the data from the partition B, and data from a partition D, and allocate the data from the partition A, the data from the partition B, and the data from the partition D to an operation node 40'. A monitor 31 is used to monitor data processing performance in a data transmission pipe 21 in the operation node 40. A monitor 32 is used to monitor data processing performance in a data transmission pipe 22 in the operation node 40. A monitor 33 is used to monitor data processing performance in a data transmission pipe 23 in the operation node 40. For the operation node 40', a monitor 31' is used to monitor data processing performance in a data transmission pipe 21' in the operation node 40'. A monitor 32' is used to monitor data processing performance in a data transmission pipe 22' in the operation node 40'. A monitor 34' is used to monitor data processing performance in a data transmission pipe 24' in the operation node 40'.

For specific descriptions of the control node, the data transmission pipe, the monitor, and the operation node, refer to embodiments described in FIG. 1 and FIG. 2. Details are not described herein again.

Figure 5:
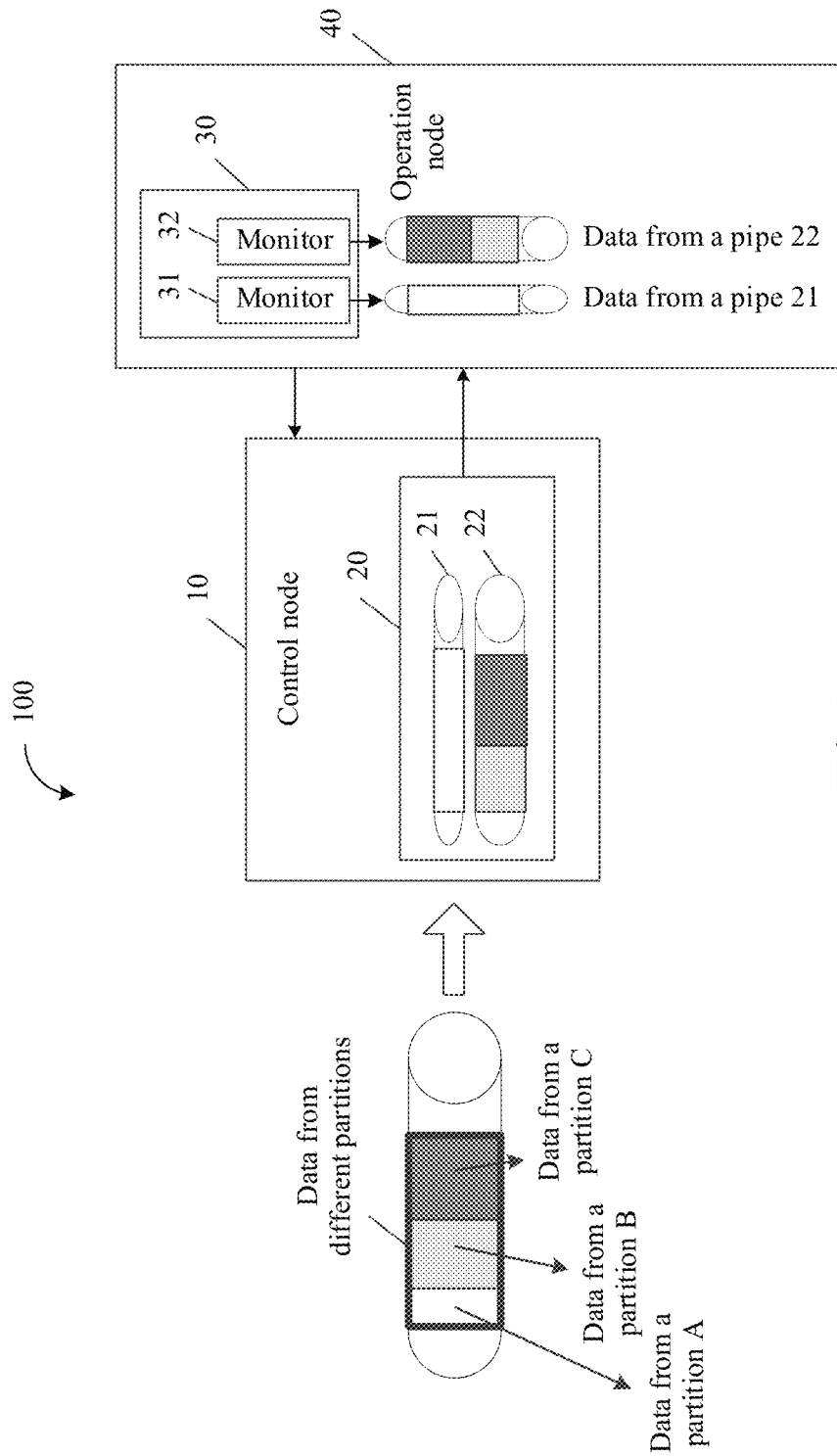
FIG. 5 is a schematic diagram of a structure of yet still another data processing system 100 according to an embodiment of this application.

Optionally, a quantity of data transmission pipes 20 disposed in the control node 10 may be different from a quantity of partitions to which the received data belongs. Refer to FIG. 5. FIG. 5 is a schematic diagram of a structure of yet still another data processing system 100 according to an embodiment of this application. As shown in FIG. 5, a control node 10 may establish two data transmission pipes for received data: a data transmission pipe 21 and a data transmission pipe 22. The data transmission pipe 21 is configured to transmit the received data from a partition A to an operation node 40. The data transmission pipe 22 is configured to transmit the received data from both a partition B and a partition C to the operation node 40. A monitor 31 is configured to monitor processing performance of data from the data transmission pipe 21, in the operation node 40. A monitor 32 is configured to monitor processing performance of data from the data transmission pipe 22, in the operation node 40.

For specific descriptions of the control node 10, a data transmission pipe 20, a monitor 30, and the operation node 40, refer to embodiments described in FIG. 1 and FIG. 2. Details are not described herein again.

Optionally, a function of the monitor 30 may be implemented by the operation node 40. In other words, the monitor 30 is located in the operation node 40. The function of the monitor 30 may further be implemented by the control node 10. In other words, the monitor 30 is located in the control node 10. The function of the monitor 30 may further be implemented by an independent device. In other words, the monitor 30 is implemented as the independent device.

Figure 6:
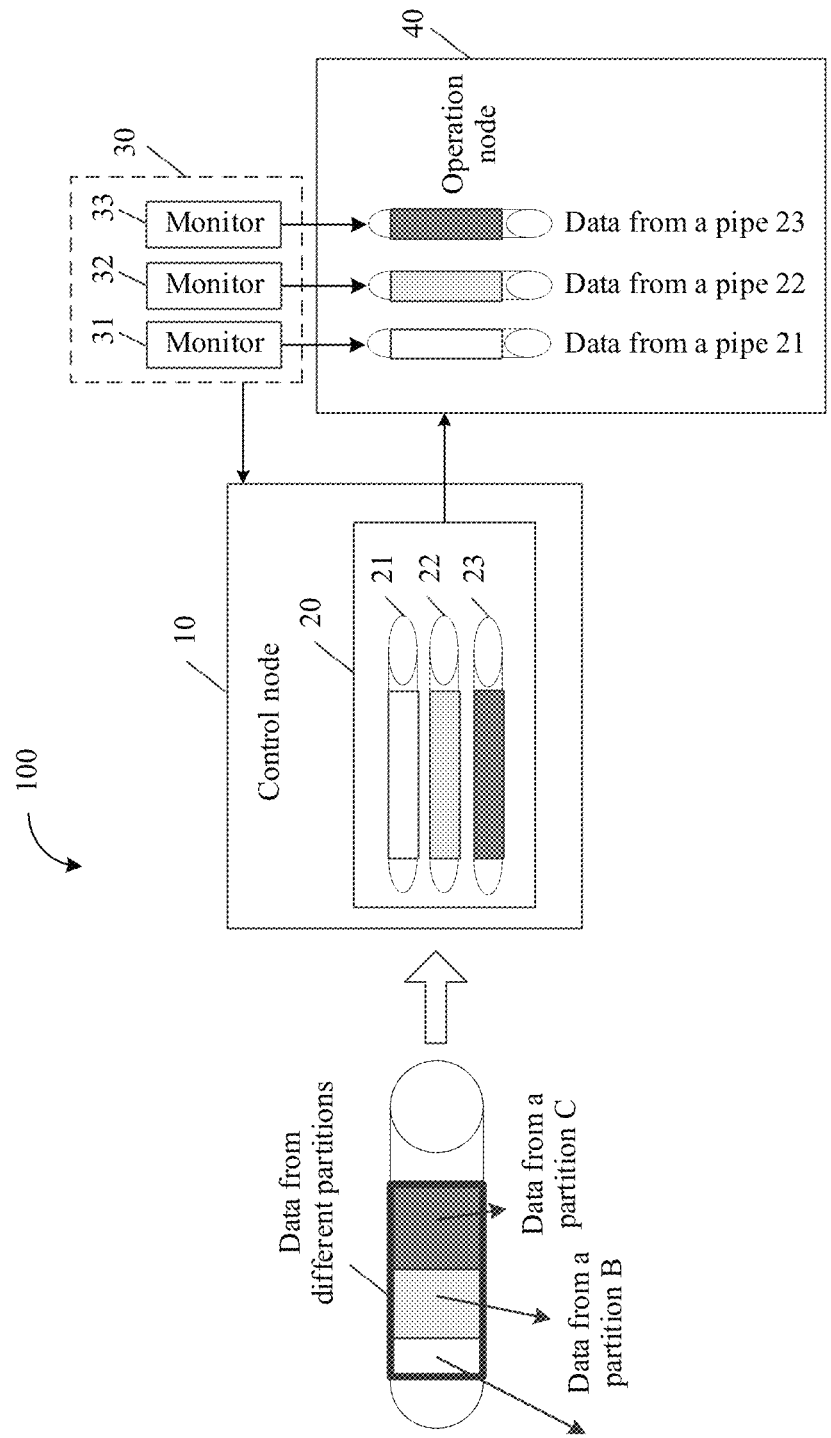
FIG. 6 is a schematic diagram of a structure of a still another data processing system 100 according to an embodiment of this application.

Refer to FIG. 6. FIG. 6 is a schematic diagram of a structure of still another data processing system 100 according to an embodiment of this application. A monitor 31, a monitor 32, and a monitor 33 may be integrated into an operation node 40, may be integrated into a control node 10, or may be implemented by an independent device. In addition, the monitor 31, the monitor 32, and the monitor 33 may be integrated into one independent device, or the monitor 31, the monitor 32, and the monitor 33 may be integrated into three independent devices respectively. This is not limited in this embodiment of this application.

When a monitor 30 detects that processing performance of data from a data transmission pipe is lower than a first threshold, the monitor 30 may send an alarm signal to the control node 10, or the monitor 30 may instruct the operation node 40 to send an alarm signal to the control node 10. This is not limited in this embodiment of this application.

For specific descriptions of the control node 10, a data transmission pipe 20, the monitor 30, and the operation node 40, refer to embodiments described in FIG. 1 and FIG. 2. Details are not described herein again.

The foregoing examples of the data processing system 100 are merely used to explain this embodiment of this application, and should not constitute a limitation.

Figure 7:
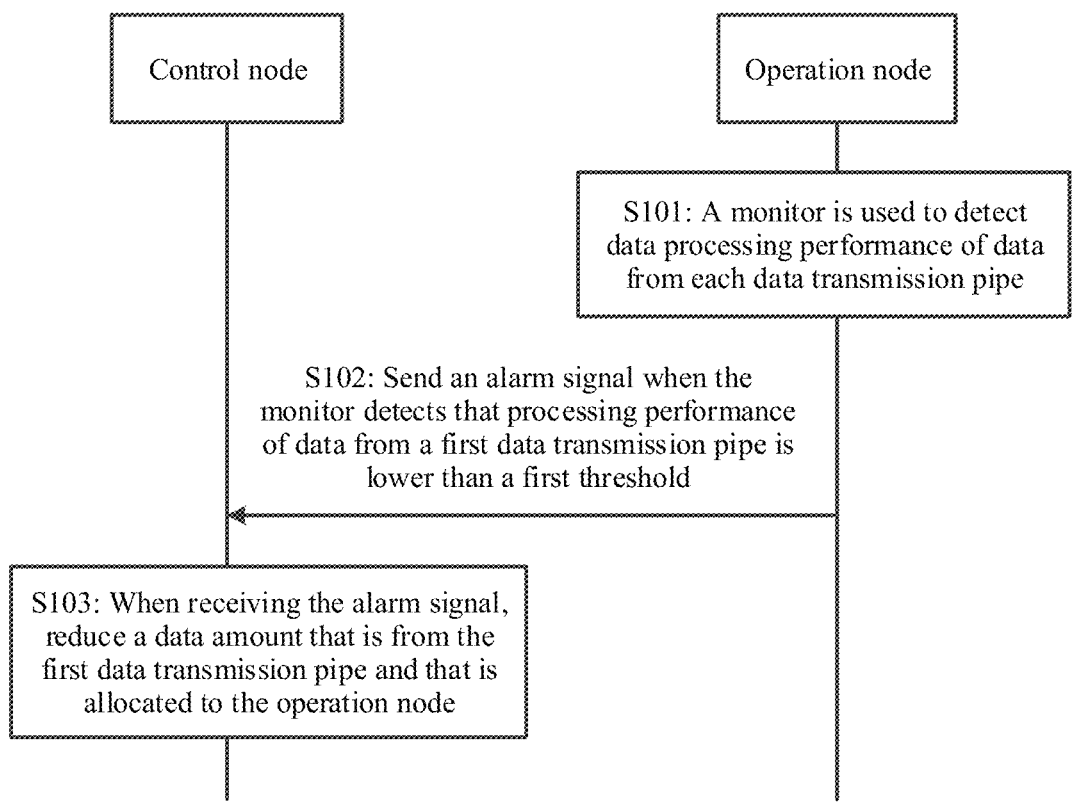
FIG. 7 is a schematic flowchart of a data processing method according to an embodiment of this application.

Based on the data processing system, an embodiment of this application further provides a data processing method. The method is applied to the data processing system described in any one of FIG. 2 to FIG. 6. Refer to FIG. 7. FIG. 7 is a schematic flowchart of a data processing method according to this embodiment of this application. As shown in FIG. 7, the data processing method includes but is not limited to the following steps:

S101: In the data processing system, a monitor is used to monitor data processing performance of data from each data transmission pipe.

S102: Send an alarm signal to a control node when the monitor detects that processing performance of data from a first data transmission pipe is lower than a first threshold.

The first data transmission pipe may be any data transmission pipe in a plurality of data transmission pipes. The alarm signal is used to indicate that the processing performance of the data from the first data transmission pipe is excessively low.

S103: When receiving the alarm signal, the control node reduces a data amount that is from the first data transmission pipe and that is allocated to an operation node.

Optionally, before the monitor is used to monitor the data processing performance for the data from each data transmission pipe in the operation node, the control node may construct the plurality of data transmission pipes according to partitioning policy information. The plurality of data transmission pipes is used to separately transmit data received by the control node from a user or another node. A quantity of data partitions obtained according to the partitioning policy information may be the same as or different from a quantity of constructed data transmission pipes. For example, as shown in FIG. 2, one data transmission pipe may be constructed for each type of partition data, and three data transmission pipes are constructed to respectively transmit the three types of partition data. For another example, as shown in FIG. 5, the data transmission pipe 21 is constructed for the data from the partition A, and is configured to transmit the data from the partition A to the operation node. The data from both the partition B and the partition C is constructed with the same data transmission pipe 22. The quantity of data transmission pipes created according to a partitioning policy is not limited in this embodiment of this application.

Optionally, the monitor may be created by the operation node for each data transmission pipe. To be specific, in the operation node, one monitor is created for the data from each data transmission pipe to perform performance monitoring in a processing process. A quantity of monitors may be the same as the quantity of data transmission pipes.

Optionally, that each monitor detects the processing performance of data from the data transmission pipe may include two implementations, which are separately described below:

A first manner may be that the monitor is used to monitor a data processing speed of a processor in the operation node. A second threshold may be preset for the data processing speed of the processor. When the monitor detects that the data processing speed of the processor is less than or equal to the second threshold, the operation node sends the alarm signal to the control node.

A second manner may be the monitor is used to monitor a response speed of a data processing request in the operation node, or a delay of a data processing request is used to represent a response speed of the data processing request. A third threshold may be preset for the response speed of the data processing request. When the monitor detects that the response speed of the data processing request is less than or equal to the third threshold, the operation node sends, to the control node, the alarm signal used to indicate that the processing performance of the data from the first data transmission pipe is excessively low.

The monitor may monitor the processing performance of the data from the data transmission pipe in any one or two of the foregoing manners. This is not limited in this embodiment of this application.

Optionally, that the control node reduces the data amount that is from the first data transmission pipe and that is allocated to the operation node may also include two implementations, which are separately described below.

A first manner is that the control node may reduce a speed of placing data into the first data transmission pipe, to reduce a speed of data transmission in the first data transmission pipe. In other words, a speed of the data that is from the first data transmission pipe and that is flowing into the operation node may be reduced. This may reduce congestion of processing the data from the first data transmission pipe by the operation node, and improve processing performance of the data processing system.

A second manner is that the control node may keep a speed of placing data into the first data transmission pipe unchanged, but reduce a speed at which the first data transmission pipe transmits the data to the operation node. This may reduce congestion of processing the data from the first data transmission pipe by the operation node, and improve processing performance of the data processing system. Reducing the speed at which the first data transmission pipe transmits the data to the operation node may be reducing the speed at which the first data transmission pipe sends the data to the operation node, or may be reducing a speed at which the operation node extracts the data from the first data transmission pipe. This is not limited in this embodiment of this application.

The control node may reduce, in any one or two of the foregoing manners, the data amount that is from the first data transmission pipe and that is allocated to the operation node. This is not limited in this embodiment of this application.

Optionally, there may be a plurality of operation nodes in the data processing system. There may be one or more operation nodes that perform the data processing performance monitoring. When the plurality of operation nodes need to perform the data processing performance monitoring and data traffic control, the data processing performance monitoring and data traffic control between the plurality of operation nodes may be separately performed, without affecting each other. The data processing performance monitoring and the data traffic control between the plurality of operation nodes may also be performed in the first data transmission pipe. The control node determines by comprehensively considering results of the monitoring performed by the monitor in the plurality of operation nodes, a data amount that is from the first data transmission pipe and that is allocated to each operation node.

For example, if both operation nodes A and B need to perform the data processing performance monitoring and the data traffic control, a process in which an operation node A performs the monitoring and the traffic control in the first data transmission pipe and a process in which an operation node B performs the monitoring and the traffic control in the first data transmission pipe may be separately performed, without affecting each other. That the control node reduces the data amount that is from the first data transmission pipe and that is allocated to the operation node may be implemented by reducing the speed at which the first data transmission pipe transmits the data to the operation node.

In the foregoing example, the control node may also perform the traffic control by comprehensively considering results detected on the operation node A and the operation node B by using the monitor. Specifically, for example, the speed of placing the data into the first data transmission pipe may be reduced only when the control node receives a first alarm signal sent by the operation node A and receives a second alarm signal sent by the operation node B. The first alarm signal is used to indicate that the processing performance of the data from the first data transmission pipe is excessively low. The second alarm signal is used to indicate that the processing performance of the data from the first data transmission pipe is excessively low. The control node does not respond to an alarm signal when receiving the alarm signal that is sent by either of the operation node A and the operation node B and that indicates that the processing performance of the data from the first data transmission pipe is excessively low.

The foregoing example is merely used to explain this embodiment of this application. When there is the plurality of operation nodes, a specific policy for the data processing performance monitoring and the data traffic control may be designed based on a user requirement or a service requirement for using the data processing system. This is not limited in this embodiment of this application.

A function of the monitor may be implemented by the operation node, may be implemented by the control node, or may be implemented by an independent device. This is not limited in this embodiment of this application.

When the data processing system is a real-time data processing system, the real-time data processing system requires a fast data processing response speed. Compared with another processing node (for example, a processing node configured to perform an operation such as data calculation or deletion/modification), a database processes a larger data amount, and has a more complex data processing process. The data processing process in the database can better reflect the data processing performance of the entire data processing system. Therefore, if the data processing system includes the plurality of operation nodes, the operation node selected for the monitoring may be the database. In a scenario of the real-time data processing system, an operation node selected for the monitoring is the database, so that the data processing performance of the data processing system is monitored more accurately, and the data traffic control is performed more accurately.

The foregoing describes in detail the method in the embodiments of this application. The following provides apparatuses in the embodiments of this application.

Figure 8:
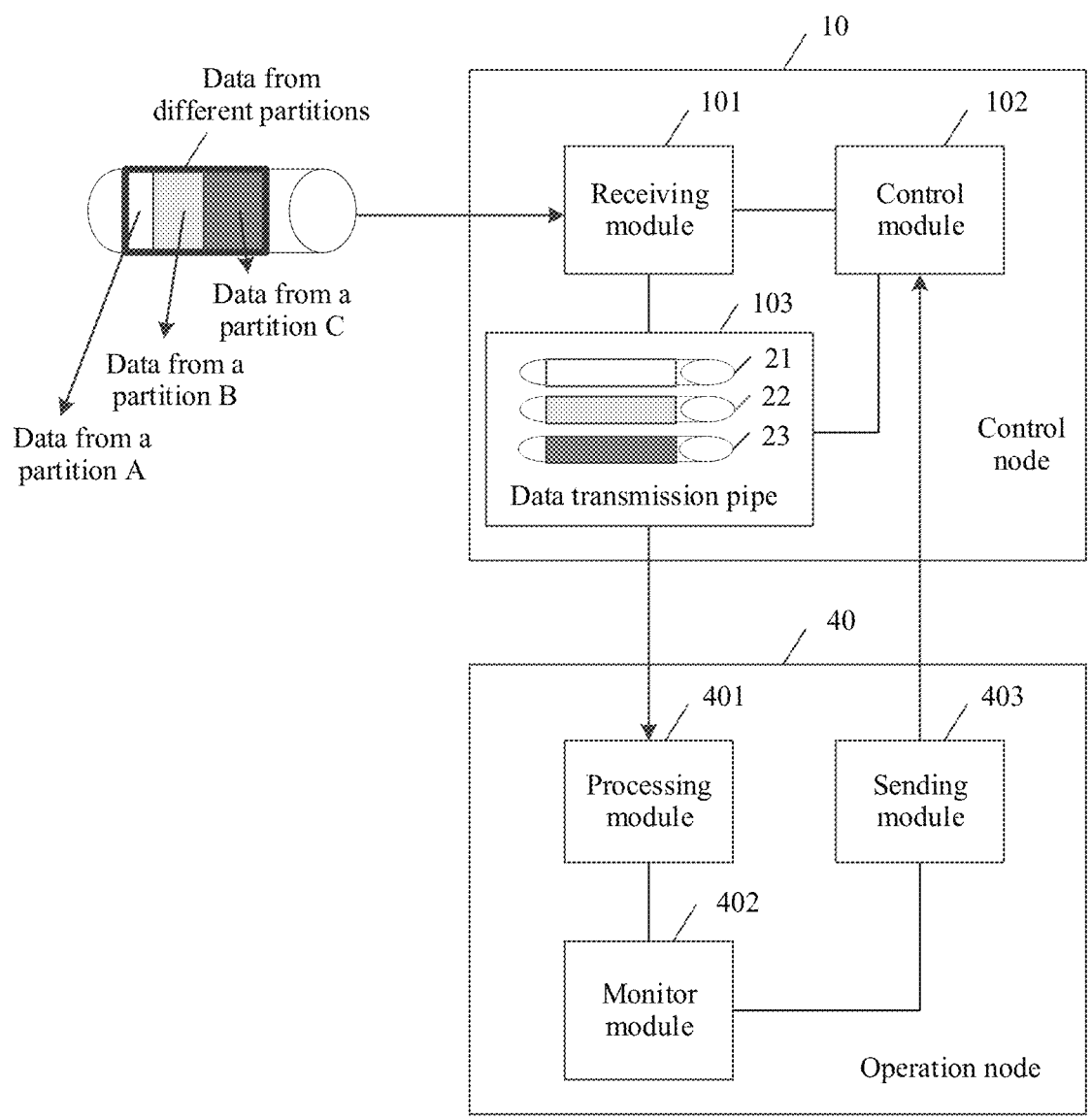
FIG. 8 is a schematic diagram of structures of an operation node 40 and a control node 10 according to an embodiment of this application.

Refer to FIG. 8. FIG. 8 is a schematic diagram of structures of an operation node 40 and a control node 10 according to an embodiment of this application. As shown in FIG. 8, the operation node 40 and the control node 10 are applied to a data processing system 100. The data processing system 100 may be the data processing system described in any one of FIG. 2 to FIG. 6.

The control node 10 may include a receiving module 101, a control module 102, and a plurality of data transmission pipes 103. The receiving module 101 is configured to receive data. The data may be data from different partitions.

As shown in FIG. 8, the data received by the receiving module 101 may include data from a partition A, data from a partition B, and data from a partition C.

The control module 102 is configured to separately send the data received by the receiving module 101 to the operation node 40 through the plurality of data transmission pipes 103.

As shown in FIG. 8, the plurality of data transmission pipes 103 may include a data transmission pipe 21, a data transmission pipe 22, and a data transmission pipe 23.

The operation node 40 may include a processing module 401, a monitor module 402, and a sending module 403. The processing module 401 is configured to receive the data from the plurality of data transmission pipes 103 for processing.

The monitor module 402 is configured to monitor processing performance of the data from the plurality of data transmission pipes.

The sending module 403 is configured to send an alarm signal to the control node 10 when the monitor module 402 detects that processing performance of data from a first data transmission pipe is lower than a first threshold. The alarm signal is used to indicate that the processing performance of the data from the first data transmission pipe is excessively low. The first data transmission pipe is any data transmission pipe in the plurality of data transmission pipes. To be specific, as shown in FIG. 8, the first data transmission pipe may be any data transmission pipe in the data transmission pipe 21, the data transmission pipe 22, and the data transmission pipe 23.

Specifically, the alarm signal may be sent by the sending module 403 to the control module 102.

The control module 102 is further configured to, when receiving the alarm signal, reduce a data amount that is from the first data transmission pipe and that is allocated to the processing module 401.

Optionally, the monitor module 402 is specifically configured to perform at least one of the following for data from each data transmission pipe: monitoring a data processing speed of the processing module 401, and monitoring a processing response speed of the processing module 401.

Optionally, the sending module 403 is specifically configured to send the alarm signal to the control module 102 when the monitor module 402 detects that a processing speed of the data from the first data transmission pipe is lower than a second threshold.

Optionally, the sending module 403 is specifically configured to send the alarm signal to the control module 102 when the monitor module 402 detects that a processing response speed of the data from the first data transmission pipe is lower than a third threshold.

Optionally, the control module 102 is specifically configured to perform at least one of the following when receiving the alarm signal: reducing a rate at which the first data transmission pipe receives data, and reducing a rate at which the first data transmission pipe transmits data to the processing module 401.

Optionally, the plurality of data transmission pipes 103 are created by the control module 102 according to partitioning policy information, and a partition of the data received by the receiving module 101 is determined according to the partitioning policy information.

Optionally, when the data processing system 100 is a real-time data processing system, and when there are a plurality of operation nodes and the operation node includes at least one database, the operation node 40 is a database. The monitor module 403 is configured to monitor processing performance of data separately from the plurality of data transmission pipes 103, in the database.

In this embodiment, for functions of the modules, refer to corresponding descriptions in the embodiment of the data processing method shown in FIG. 7. Details are not described herein again.

Figure 9:
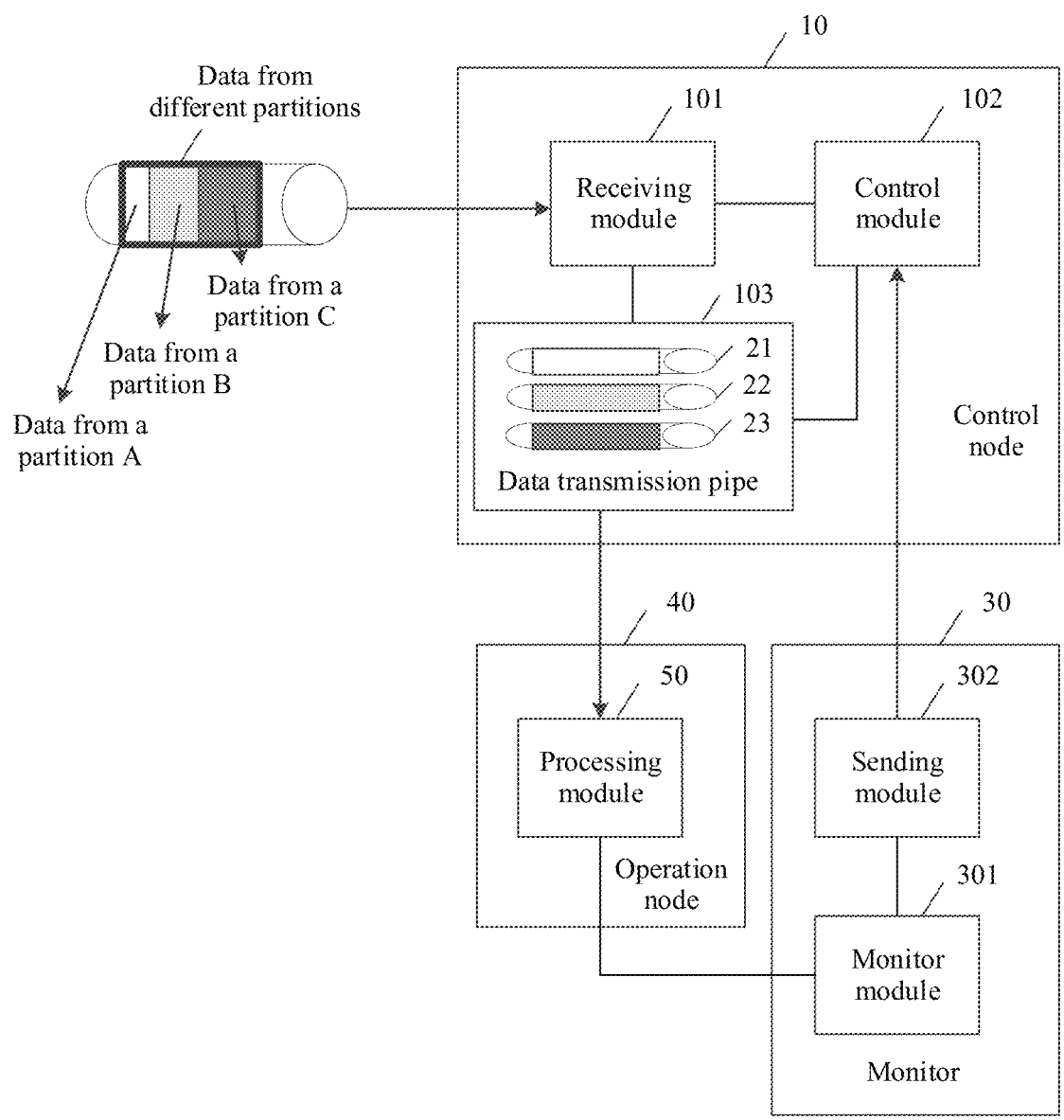
FIG. 9 is a schematic diagram of structures of an operation node 40, a monitor 30, and a control node 10 according to an embodiment of this application.

Refer to FIG. 9. FIG. 9 is a schematic diagram of structures of an operation node 40, a monitor 30, and a control node 10 according to an embodiment of this application. As shown in FIG. 9, the operation node 40, the monitor 30, and the control node 10 are applied to a data processing system 100. The data processing system 100 may be the data processing system described in any one of FIG. 2 to FIG. 6.

The control node 10 may include a receiving module 101, a control module 102, and a plurality of data transmission pipes 103. The receiving module 101 is configured to receive data. The data may be data from different partitions.

As shown in FIG. 9, the data received by the receiving module 101 may include data from a partition A, data from a partition B, and data from a partition C.

The control module 102 is configured to separately send the data received by the receiving module 101 to the operation node 40 through the plurality of data transmission pipes 103.

As shown in FIG. 9, the plurality of data transmission pipes 103 may include a data transmission pipe 21, a data transmission pipe 22, and a data transmission pipe 23.

The operation node 40 may include a processing module 501, configured to receive data from the plurality of data transmission pipes 103 for processing.

The monitor 30 may include a monitor module 301 and a sending module 302.

The monitor module 301 is configured to monitor processing performance of the processing module 501 on the data from the plurality of data transmission pipes 103.

The sending module 302 is configured to send an alarm signal to the control node 10 when the monitor module 301 detects that processing performance of data from a first data transmission pipe is lower than a first threshold. The alarm signal is used to indicate that the processing performance of the data from the first data transmission pipe is excessively low. The first data transmission pipe is any data transmission pipe in the plurality of data transmission pipes. To be specific, as shown in FIG. 9, the first data transmission pipe may be any data transmission pipe in the data transmission pipe 21, the data transmission pipe 22, and the data transmission pipe 23.

Specifically, the alarm signal may be sent by the sending module 302 to the control module 102.

Optionally, the sending module 302 may further be included in the operation node 40, and is configured to send the alarm signal to the control module 102 when the monitor module 301 detects that a processing speed of the data from the first data transmission pipe is lower than a first threshold.

The control module 102 is further configured to, when receiving the alarm signal, reduce a data amount that is from the first data transmission pipe and that is allocated to the processing module 501.

Optionally, the monitor module 301 is specifically configured to perform at least one of the following for data from each data transmission pipe: monitoring a data processing speed of the processing module 501, and monitoring a processing response speed of the processing module 501.

Optionally, the sending module 302 is specifically configured to send the alarm signal to the control module 102 when the monitor module 301 detects that a processing speed of the data from the first data transmission pipe is lower than a second threshold.

Optionally, the sending module 302 specifically sends the alarm signal to the control module 102 when the monitor module 301 detects that a processing response speed of the data from the first data transmission pipe is lower than a third threshold.

Optionally, the control module 102 is specifically configured to perform at least one of the following when receiving the alarm signal: reducing a rate at which the first data transmission pipe receives data, and reducing a rate at which the first data transmission pipe transmits data to the processing module 501.

Optionally, the plurality of data transmission pipes 103 are created by the control module 102 according to partitioning policy information, and a partition of the data received by the receiving module 101 is determined according to the partitioning policy information.

Optionally, when the data processing system 100 is a real-time data processing system, and when there are a plurality of operation nodes and the operation node includes at least one database, the operation node 40 is a database. The monitor module 301 is configured to monitor processing performance of data separately from the plurality of data transmission pipes 103, in the database.

In this embodiment, for functions of the modules, refer to corresponding descriptions in the embodiment of the data processing method shown in FIG. 7. Details are not described herein again.

Figure 10:
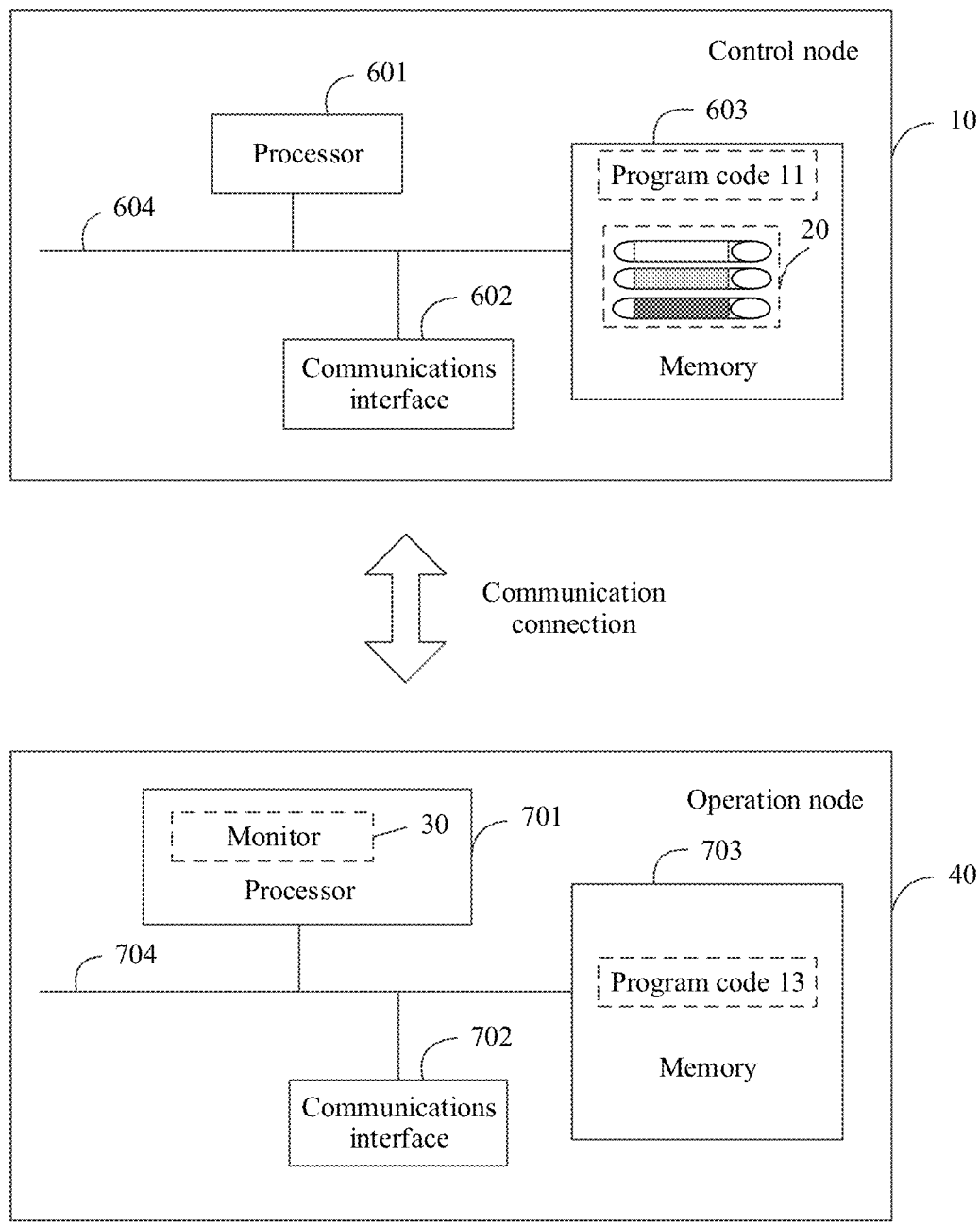
FIG. 10 is a schematic diagram of a structure of a still another data processing system 100 according to an embodiment of this application.

Refer to FIG. 10. FIG. 10 is a schematic diagram of a structure of still another data processing system 100 according to this embodiment of this application. The data processing system 100 includes a control node 10 and an operation node 40. The control node 10 establishes a communication connection to the operation node 40. A plurality of data transmission pipes 20 are established between the control node 10 and the operation node 40. The control node 10 transmits received data to the operation node 40 through the plurality of data transmission pipes 20. A monitor 30 is separately disposed in the data processing system 100 for data from the plurality of data transmission pipes 20, and is configured to monitor processing performance of the data from the plurality of data transmission pipes 20.

As shown in FIG. 10, the control node 10 provided in this embodiment of this application includes one or more processors 601, a communications interface 602, and a memory 603. The processor 601, the communications interface 602, and the memory 603 may be connected through a bus or in another manner. In this embodiment of the present application, for an example, the processor 601, the communications interface 602, and the memory 603 are connected through a bus 604. The processor 601 may include one or more general purpose processors, for example, one or more central processing units (CPU).

The processor 601 may be configured to run related program code 11, and the related program code 11 includes the plurality of data transmission pipes 20. In other words, the processor 601 may execute the program code 11 to implement functions of the plurality of data transmission pipes 20. The data transmission pipe 20 is a logical concept and corresponds to a storage area.

The communications interface 602 may be a wired interface (for example, an Ethernet interface) or a wireless interface (for example, a cellular network interface or a wireless local area network interface), and is configured to communicate with another node. In this embodiment of this application, the communications interface 602 may be specifically configured to receive an alarm signal sent by the operation node 40, and further send data from the data transmission pipe 20 to the operation node 40.

The memory 603 may include a volatile memory, for example, a random access memory (RAM). The memory 603 may further include a non-volatile memory, for example, a read-only memory (ROM), a flash memory, a hard disk drive (HDD), or a solid-state drive (SSD). Alternatively, the memory 603 may include a combination of the foregoing types of memories. The memory 603 may be configured to store a group of program code 11, so that the processor 601 invokes the program code 11 stored in the memory 603 to implement a method for implementing the data processing method in the embodiments of the present application on a side of the control node 10.

In a specific application scenario, the data transmission pipe 20 and the like are software modules. The software modules may be deployed on a server, a virtual machine on a server, or a container on a server.

It should be noted that the control node 10 shown in FIG. 10 is only an implementation of this embodiment of this application. In an actual application, the control node 10 may further include more or fewer components. This is not limited herein.

As shown in FIG. 10, the operation node 40 provided in this embodiment of this application includes one or more processors 701, a communications interface 702, and a memory 703. The processor 701, the communications interface 702, and the memory 703 may be connected through a bus or in another manner. In this embodiment of the present application, for an example, the processor 701, the communications interface 702, and the memory 703 are connected through a bus 704. The processor 701 may include one or more general purpose processors, for example, one or more central processing units CPUs.

The processor 701 may be configured to run related program code 13, and the related program code 13 includes the monitor 30. In other words, the processor 701 may execute the program code 13 to implement any one or more functions of the monitor 30.

The communications interface 702 may be a wired interface (for example, an Ethernet interface) or a wireless interface (for example, a cellular network interface or a wireless local area network interface), and is configured to communicate with another node. In this embodiment of this application, the communications interface 702 may be specifically configured to send the alarm signal to the control node 10, and may further receive the data transmitted in the data transmission pipe 20.

The memory 703 may include a volatile memory, for example, a RAM. The memory 703 may further include a non-volatile memory, for example, a ROM, a flash memory, an HDD, or a solid-state drive SSD. Alternatively, the memory 703 may include a combination of the foregoing types of memories. The memory 703 may be configured to store a group of program code 13, so that the processor 701 invokes the program code 13 stored in the memory 703 to implement a method for implementing the data processing method in the embodiments of the present application on a side of the operation node 40.

In a specific application scenario, the monitor 30 and the like are software modules. The software modules may be deployed on a server, a virtual machine on a server, or a container on a server.

It should be noted that the operation node 40 shown in FIG. 10 is only an implementation of this embodiment of this application. In an actual application, the operation node 40 may further include more or fewer components. This is not limited herein.

Figure 11:
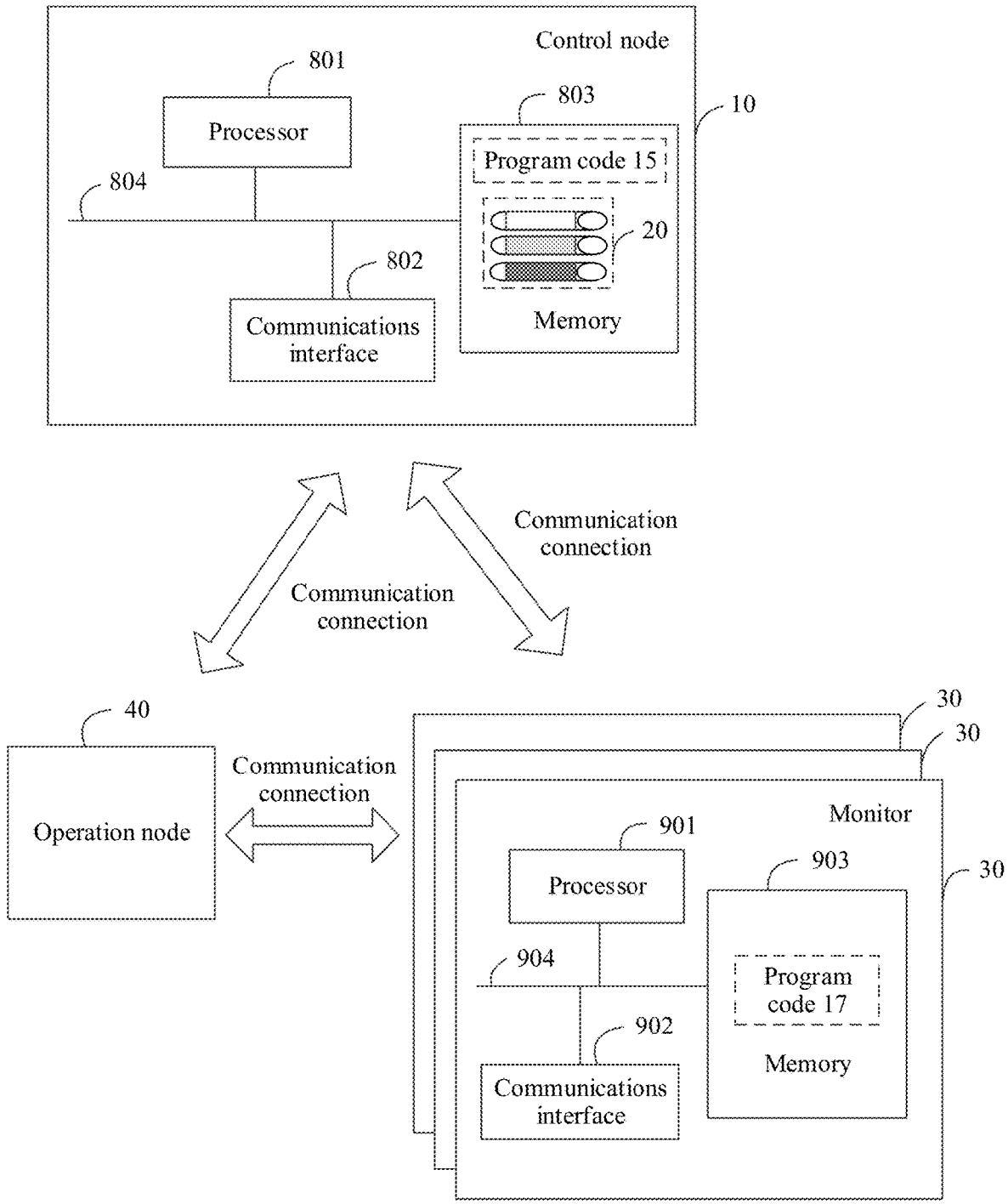
FIG. 11 is a schematic diagram of a structure of a still another data processing system 100 according to an embodiment of this application.

Refer to FIG. 11. FIG. 11 is a schematic diagram of a structure of still another data processing system 100 according to this embodiment of this application. The data processing system 100 includes a control node 10, a monitor 30, and an operation node 40. A plurality of data transmission pipes 20 are established between the control node 10 and the operation node 40. The control node 10 transmits received data to the operation node 40 through the plurality of data transmission pipes 20. The monitor 30 is separately disposed in the data processing system 100 for data from the plurality of data transmission pipes 20, and is configured to monitor processing performance of the data from the plurality of data transmission pipes 20. There may be a plurality of monitors 30. One monitor 30 may be disposed for each data transmission pipe. The monitor 30 is configured to monitor processing performance of data from the data pipe. The control node 10 establishes a communication connection to the operation node 40. The control node 10 establishes a communication connection to each monitor 30. Each monitor 30 establishes a communication connection to the operation node 40. The plurality of monitors 30 may be implemented by one device, or may be implemented by a plurality of devices.

As shown in FIG. 11, the control node 10 provided in this embodiment of this application includes one or more processors 801, a communications interface 802, and a memory 803. The processor 801, the communications interface 802, and the memory 803 may be connected through a bus or in another manner. In this embodiment of this application, for an example, the processor 801, the communications interface 802, and the memory 803 are connected through a bus 804. The processor 801 may include one or more general purpose processors, for example, one or more CPUs.

The processor 801 may be configured to run related program code 15, and the related program code 15 includes the plurality of data transmission pipes 20. In other words, the processor 801 may execute the program code 15 to implement functions of the plurality of data transmission pipes 20. The data transmission pipe 20 is a logical concept and corresponds to a storage area.

The communications interface 802 may be a wired interface (for example, an Ethernet interface) or a wireless interface (for example, a cellular network interface or a wireless local area network interface), and is configured to communicate with another node. In this embodiment of this application, the communications interface 802 may be specifically configured to receive an alarm signal sent by the monitor 30, and further send data from the data transmission pipe 20 to the operation node 40.

The memory 803 may include a volatile memory, for example, a RAM. The memory 803 may further include a non-volatile memory, for example, a ROM, a flash memory, an HDD, or a solid-state drive SSD. Alternatively, the memory 803 may include a combination of the foregoing types of memories. The memory 803 may be configured to store a group of program code 15, so that the processor 801 invokes the program code 15 stored in the memory 803 to implement a method for implementing the data processing method in the embodiments of this application on a side of the control node 10.

In a specific application scenario, the data transmission pipe 20 and the like are software modules. The software modules may be deployed on a server, a virtual machine on a server, or a container on a server.

It should be noted that the control node 10 shown in FIG. 11 is only an implementation of this embodiment of this application. In an actual application, the control node 10 may further include more or fewer components. This is not limited herein.

As shown in FIG. 11, the monitor 30 provided in this embodiment of this application includes one or more processors 901, a communications interface 902, and a memory 903. The processor 901, the communications interface 902, and the memory 903 may be connected through a bus or in another manner. In this embodiment of this application, for an example, the processor 901, the communications interface 902, and the memory 903 are connected through a bus 904. The processor 901 may include one or more general purpose processors, for example, one or more central processing units (CPUs).

The processor 901 may be configured to run related program code 17, and the related program code 17 includes the monitor 30. In other words, the processor 901 may execute the program code 17 to implement a function on a side of the monitor 30.

The communications interface 902 may be a wired interface (for example, an Ethernet interface) or a wireless interface (for example, a cellular network interface or a wireless local area network interface), and is configured to communicate with another node. In this embodiment of this application, the communications interface 902 may be specifically configured to send an alarm signal to the control node 10, and may further monitor data processing performance of the operation node 40.

The memory 903 may include a volatile memory, for example, a RAM. The memory 903 may further include a non-volatile memory, for example, a ROM, a flash memory, an HDD, or a solid-state drive SSD. Alternatively, the memory 903 may include a combination of the foregoing types of memories. The memory 903 may be configured to store a group of program code 17, so that the processor 901 invokes the program code 17 stored in the memory 903 to implement a method for implementing the data processing method in the embodiments of this application on a side of the monitor 30.

In a specific application scenario, the monitor 30 may be software modules. The software modules may be deployed on a server, a virtual machine on a server, or a container on a server.

It should be noted that the operation node 40 shown in FIG. 11 is only an implementation of this embodiment of this application. In an actual application, the monitor 30 may further include more or fewer components. This is not limited herein.

An embodiment of this application further provides a chip system. The chip system includes at least one processor, a memory, and an interface circuit. The memory, the transceiver, and the at least one processor are interconnected through a line. The at least one memory stores an instruction. When the instruction is executed by the processor, the method procedure shown in FIG. 7 is implemented.

An embodiment of this application further provides a computer-readable storage medium. The computer-readable storage medium stores an instruction. When the instruction is run on a processor, the method procedure shown in FIG. 7 is implemented.

An embodiment of this application further provides a computer program product. When the computer program product is run on a processor, the method procedure shown in FIG. 7 is implemented.

It may be understood that, in this application, technical terms and technical solutions in different embodiments may be mutually referenced and mutually cited based on logic of the embodiments. The embodiments to which the technical terms and the technical solutions are applicable are not limited in this application. The technical solutions in the different embodiments are combined with each other, and a new embodiment may further be formed.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedure or functions according to the embodiments of this application are all or partially generated. The computer may be a general-purpose computer, a special-purpose computer, a computer network, or another programmable apparatus. The computer instruction may be stored in a computer-readable storage medium, or may be transmitted by using the computer-readable storage medium. The computer instruction may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the procedures of the methods in the embodiments may be implemented by a computer program instructing related hardware. The program may be stored in a computer-readable storage medium. When the program is run, the procedures of the methods in the embodiments may be performed. The foregoing storage medium includes any medium that can store program code, such as a ROM or a random access memory RAM, a magnetic disk, or an optical disc.

What is claimed is:

1. A data processing method, wherein the method is applied to a data processing system comprising a control node and an operation node, and the method comprises:

establishing, by the control node, a plurality of data transmission pipes between the control node and the operation node;

disposing, by the control node, a plurality of monitors in the data processing system for the plurality of data transmission pipes, wherein each monitor is associated with a respective data transmission pipe of the plurality of data transmission pipes;

transmitting, by the control node, received data to the operation node through the plurality of data transmission pipes;

receiving, by the control node, an alarm signal from a first monitor in response to the first monitor among the plurality of monitors detecting that processing performance of data from a first data transmission pipe among the plurality of data transmission pipes is lower than a first threshold, wherein the first monitor is associated with the first data transmission pipe, the alarm signal is used to indicate that the processing performance of the data from the first data transmission pipe is excessively low, the first monitor is one of the plurality of monitors, and the first data transmission pipe is any data transmission pipe in the plurality of data transmission pipes;

in response to receiving the alarm signal, independently reducing, by the control node, a data amount that is from the first data transmission pipe only and that is allocated to the operation node, without impacting data traffic from any other data transmission pipes; and in response to detecting that a data request delay in the data processing exceeds a preset delay requirement threshold, receiving, by the control node, a second alarm signal from one monitor from among the plurality of monitors, wherein the plurality of data transmission pipes established between the control node and the operation node are created by the control node according to partitioning policy information, and wherein the partitioning policy information is used by the control node to determine a partition used to store data received by the data processing system, and wherein each data transmission pipe is created for data from one or more partitions indicated by the partitioning policy.

2. The method according to claim 1, wherein each monitor is configured to monitor processing performance of data from the plurality of data transmission pipes and perform any one of the following for data from each data transmission pipe:

monitoring a processing response speed of the operation node; or monitoring a data processing speed of the operation node.

3. The method according to claim 2, wherein the receiving, by the control node, the alarm signal from the first monitor in response to the first monitor detecting that processing performance of data from the first data transmission pipe is lower than the first threshold comprises:

receiving, by the control node, the alarm signal from the first monitor in response to the first monitor detecting that a processing speed of the data from the first data transmission pipe is lower than a second threshold.

4. The method according to claim 1, wherein the receiving, by the control node, the alarm signal from the first monitor in response to the first monitor detecting that processing performance of data from the first data transmission pipe is lower than the first threshold comprises:

receiving, by the control node, the alarm signal from the first monitor in response to the first monitor detecting that a processing response speed of the data from the first data transmission pipe is lower than a third threshold.

5. The method according to claim 1, wherein the reducing, by the control node, the data amount that is from the first data transmission pipe only and that is allocated to the operation node comprises at least one of the following:

reducing, by the control node, a rate at which the first data transmission pipe receives data; and reducing, by the control node, a rate at which the first data transmission pipe transmits data to the operation node.

6. A data processing system, comprising:

a control node; and an operation node;

wherein the control node is configured to:

establish a plurality of data transmission pipes between the control node and the operation node;

dispose a plurality of monitors in the data processing system to monitor data from the plurality of data transmission pipes, wherein each monitor is associated with each of the plurality of data transmission pipes; and transmit received data to the operation node through the plurality of data transmission pipes, wherein the operation node is configured to process the data from the plurality of data transmission pipes, wherein the plurality of monitors are configured to monitor processing performance of the data from the plurality of data transmission pipes, wherein a first monitor among the plurality of monitors is configured to send an alarm signal to the control node in response to the first monitor detecting that processing performance of data from a first data transmission pipe is lower than a first threshold, wherein the first monitor is associated with the first data transmission pipe, the alarm signal is used to indicate that the processing performance of the data from the first data transmission pipe is excessively low, the first monitor is one of the plurality of monitors, and wherein the first data transmission pipe is any data transmission pipe in the plurality of data transmission pipes, wherein in response to receiving the alarm signal, the control node is further configured to independently reduce a data amount that is from the first data transmission pipe only and that is allocated to the operation node, without impacting data traffic from any other data transmission pipes, wherein in response to detecting that a data request delay in the data processing exceeds a preset delay requirement threshold, receiving, by the control node, a second alarm signal from one monitor from among the plurality of monitors, and wherein the plurality of data transmission pipes established between the control node and the operation node are created by the control node according to partitioning policy information, and wherein the partitioning policy information is used by the control node to determine a partition used to store data received by the data processing system.

7. The system according to claim 6, wherein each monitor is further configured to perform from each data transmission pipe:

monitoring a data processing speed of the operation node; or monitoring a processing response speed of the operation node.

8. The system according to claim 7, wherein the first monitor is further configured to send the alarm signal to the control node in response to the first monitor detecting that a processing speed of the operation node on the data from the first data transmission pipe is lower than a second threshold.

9. The system according to claim 6, wherein the first monitor is further configured to send the alarm signal to the control node in response to the first monitor detecting that a processing response speed of the operation node on the data from the first data transmission pipe is lower than a third threshold.

10. The system according to claim 6, wherein the control node is further configured to perform at least one of the following in response to receiving the alarm signal:

reducing a rate at which the first data transmission pipe receives data; and reducing a rate at which the first data transmission pipe transmits data to the operation node.

11. The system according to claim 6, wherein in response to the data processing system being a real-time data processing system, and in response to a plurality of operation nodes and the operation nodes comprising at least one database, each monitor is further configured to monitor the processing performance of the data from the plurality of data transmission pipes in the database.

12. A data processing system, comprising a processor and a memory storing processor-executable instructions stored thereon, which when executed by the processor causes the system to:

establish, by a control node, a plurality of data transmission pipes between the control node and an operational node;

dispose, by the control node, a plurality of monitors for the plurality of data transmission pipes, wherein each monitor is associated with a respective data transmission pipe of the plurality of data transmission pipes;

transmit, by the control node, data from the plurality of data transmission pipes to the operational node;

process, by the operational node, the data from the plurality of data transmission pipes;

monitor, by the plurality of monitors, processing performance of the data from the plurality of data transmission pipes associated with the plurality of monitors, wherein each monitor is associated with each of the plurality of data transmission pipes;

send, by a first monitor, an alarm signal in response to the first monitor detecting that processing performance of data from a first data transmission pipe is lower than a first threshold, wherein the first monitor is associated with the first data transmission, the alarm signal is used to indicate that the processing performance of the data from the first data transmission pipe is excessively low, the first monitor is one of the plurality of monitors, and the first data transmission pipe is any data transmission pipe in the plurality of data transmission pipes;

in response to receiving the alarm signal, independently reduce, by the control node, a data amount that is from the first data transmission data pipe only and that is allocated to the processor, without impacting data traffic from any other data transmission pipes; and in response to detecting that a data request delay in the data processing exceeds a preset delay requirement threshold, receive, by the control node, a second alarm signal from one monitor from among the plurality of monitors, wherein the plurality of data transmission pipes established between the control node and the operation node are created by the control node according to partitioning policy information, and wherein the partitioning policy information is used by the control node to determine a partition used to store data received by the data processing system.

13. The system according to claim 12, wherein when the processor-executable instructions are executed by the processor, the processor further causes the system to:
monitor a data processing speed of the processor; or
monitor a processing response speed of the processor.

14. The system according to claim 13, wherein when the processor-executable instructions are executed by the processor, the processor further causes the system to:
send the alarm signal in response to the first monitor detecting that a processing speed of the data from the first data transmission pipe is lower than a second threshold.

15. The system according to claim 12, wherein when the processor-executable instructions are executed by the processor, the processor further causes the system to:
send the alarm signal in response to the first monitor detecting that a processing response speed of the data from the first data transmission pipe is lower than a third threshold.

16. The system according to claim 12, wherein when the processor-executable instructions are executed by the processor, the processor further causes the system to:
reduce a rate at which the first data transmission pipe receives data; and
reduce a rate at which the first data transmission pipe transmits data to an operation node.

17. The system according to claim 12, wherein in response to the data processing system being a real-time data processing system and in response to a plurality of operation nodes and the operation nodes comprising at least one database, each monitor is further configured to monitor the processing performance of the data from the plurality of data transmission pipes in the database.

* * * * *